US008296666B2

(12) United States Patent
Wright et al.

(10) Patent No.: US 8,296,666 B2
(45) Date of Patent: Oct. 23, 2012

(54) SYSTEM AND METHOD FOR INTERACTIVE VISUAL REPRESENTATION OF INFORMATION CONTENT AND RELATIONSHIPS USING LAYOUT AND GESTURES

(75) Inventors: William Wright, Toronto (CA); David Schroh, Toronto (CA); Pascale Proulx, Montreal (CA); Alex Skaburskis, Toronto (CA); Brian Cort, Toronto (CA)

(73) Assignee: Oculus Info. Inc., Toronto (CA)

( * ) Notice: Subject to any disclaimer, the term of this patent is extended or adjusted under 35 U.S.C. 154(b) by 1751 days.

(21) Appl. No.: 11/289,381

(22) Filed: Nov. 30, 2005

(65) Prior Publication Data
US 2006/0117067 A1    Jun. 1, 2006

Related U.S. Application Data

(60) Provisional application No. 60/631,597, filed on Nov. 30, 2004, provisional application No. 60/631,600, filed on Nov. 30, 2004, provisional application No. 60/706,001, filed on Aug. 8, 2005, provisional application No. 60/706,002, filed on Aug. 8, 2005.

(30) Foreign Application Priority Data

Mar. 14, 2005   (CA) ..................................... 2500573

(51) Int. Cl.
*G06F 3/048* (2006.01)
(52) U.S. Cl. ......... 715/764; 715/834; 715/848; 715/863
(58) Field of Classification Search .................. 715/764, 715/836, 858, 834, 848, 863
See application file for complete search history.

(56) References Cited

U.S. PATENT DOCUMENTS

| | | | |
|---|---|---|---|
| 5,241,671 A * | 8/1993 | Reed et al. ........................... 1/1 |
| 5,422,993 A | 6/1995 | Fleming | |
| 5,598,557 A * | 1/1997 | Doner et al. ......................... 1/1 |
| 5,625,767 A * | 4/1997 | Bartell et al. ................. 345/440 |
| 5,694,594 A * | 12/1997 | Chang .................................. 1/1 |
| 5,708,767 A * | 1/1998 | Yeo et al. ...................... 345/440 |
| 5,726,687 A | 3/1998 | Belfiore et al. | |
| 5,740,389 A | 4/1998 | Li et al. | |
| 5,832,494 A * | 11/1998 | Egger et al. ........................ 1/1 |

(Continued)

FOREIGN PATENT DOCUMENTS

EP    0 538 705 A    4/1993

(Continued)

OTHER PUBLICATIONS

European Search Report for application No. EP 05257390.4; May 23, 2006; 8 pages; The European Patent Office.

(Continued)

*Primary Examiner* — Ba Huynh
(74) *Attorney, Agent, or Firm* — Grant Tisdall; Gowling Lafleur Henderson LLP

(57) ABSTRACT

This application relates to information analysis and more particularly to a system and method for interactive visual representation of information content and relationships using layouts and gestures. A visualization tool is provided which facilitates both ad-hoc and more formal analytical tasks as a flexible and expressive thinking environment. The tool provides a space focused on 'Human Interaction with Information' and enabling evidence marshalling. Capabilities of the tool include put-this-there cognition, automatic analysis templates, and gestures for the fluid expression of thought and scalability mechanisms to support large analysis tasks.

24 Claims, 19 Drawing Sheets

U.S. PATENT DOCUMENTS

| | | | | |
|---|---|---|---|---|
| 5,897,650 A * | 4/1999 | Nakajima et al. | | 715/202 |
| 5,963,965 A * | 10/1999 | Vogel | | 715/236 |
| 6,029,172 A * | 2/2000 | Jorna et al. | | 1/1 |
| 6,098,062 A * | 8/2000 | Janssen | | 706/59 |
| 6,105,046 A * | 8/2000 | Greenfield et al. | | 715/207 |
| 6,233,571 B1 * | 5/2001 | Egger et al. | | 1/1 |
| 6,243,093 B1 * | 6/2001 | Czerwinski et al. | | 715/848 |
| 6,249,606 B1 * | 6/2001 | Kiraly et al. | | 382/195 |
| 6,286,851 B1 * | 9/2001 | Sargent | | 280/455.1 |
| 6,289,342 B1 * | 9/2001 | Lawrence et al. | | 1/1 |
| 6,292,894 B1 * | 9/2001 | Chipman et al. | | 713/168 |
| 6,317,739 B1 * | 11/2001 | Hirata et al. | | 1/1 |
| 6,339,776 B2 * | 1/2002 | Dayani-Fard et al. | | 1/1 |
| 6,345,284 B1 * | 2/2002 | Dinkelacker | | 715/201 |
| 6,356,899 B1 * | 3/2002 | Chakrabarti et al. | | 707/737 |
| 6,457,004 B1 * | 9/2002 | Nishioka et al. | | 1/1 |
| 6,665,661 B1 * | 12/2003 | Crow et al. | | 1/1 |
| 6,795,826 B2 * | 9/2004 | Flinn et al. | | 1/1 |
| 6,801,229 B1 * | 10/2004 | Tinkler | | 715/853 |
| 6,918,097 B2 * | 7/2005 | Parisi | | 715/855 |
| 6,931,604 B2 * | 8/2005 | Lane | | 715/853 |
| 6,968,511 B1 * | 11/2005 | Robertson et al. | | 715/835 |
| 6,990,238 B1 * | 1/2006 | Saffer et al. | | 382/224 |
| 7,028,050 B1 * | 4/2006 | Rose | | 1/1 |
| 7,028,259 B1 * | 4/2006 | Jacobson | | 715/236 |
| 7,113,954 B2 * | 9/2006 | Vogel | | 707/737 |
| 7,143,362 B2 * | 11/2006 | Dieberger et al. | | 715/764 |
| 7,165,105 B2 * | 1/2007 | Reiner et al. | | 709/224 |
| 7,181,438 B1 * | 2/2007 | Szabo | | 1/1 |
| 7,188,156 B2 * | 3/2007 | Bertram et al. | | 709/219 |
| 7,271,804 B2 * | 9/2007 | Evans | | 345/440 |
| 7,292,243 B1 * | 11/2007 | Burke | | 345/440 |
| 7,356,777 B2 * | 4/2008 | Borchardt et al. | | 715/836 |
| 7,373,612 B2 * | 5/2008 | Risch et al. | | 715/850 |
| 7,434,155 B2 * | 10/2008 | Lee | | 715/203 |
| 7,475,072 B1 * | 1/2009 | Ershov | | 1/1 |
| 7,672,950 B2 * | 3/2010 | Eckardt et al. | | 1/1 |
| 7,693,817 B2 * | 4/2010 | Dumais et al. | | 707/999.002 |
| 7,801,896 B2 * | 9/2010 | Szabo | | 707/739 |
| 2002/0049705 A1 * | 4/2002 | Haviv-Segal et al. | | 707/1 |
| 2002/0055919 A1 * | 5/2002 | Mikheev | | 707/3 |
| 2002/0089551 A1 * | 7/2002 | Hugh et al. | | 345/853 |
| 2002/0165843 A1 * | 11/2002 | Takahashi | | 706/47 |
| 2002/0169737 A1 * | 11/2002 | Armstrong et al. | | 706/59 |
| 2003/0069908 A1 * | 4/2003 | Anthony et al. | | 707/513 |
| 2003/0110181 A1 * | 6/2003 | Schuetze et al. | | 707/103 R |
| 2003/0126136 A1 * | 7/2003 | Omoigui | | 707/10 |
| 2003/0137536 A1 * | 7/2003 | Hugh | | 345/744 |
| 2003/0195897 A1 * | 10/2003 | Agrafiotis et al. | | 707/101 |
| 2003/0227487 A1 * | 12/2003 | Hugh | | 345/777 |
| 2004/0083206 A1 * | 4/2004 | Wu et al. | | 707/3 |
| 2004/0090472 A1 * | 5/2004 | Risch et al. | | 345/853 |
| 2004/0128624 A1 * | 7/2004 | Arellano et al. | | 715/530 |
| 2004/0143796 A1 * | 7/2004 | Lerner et al. | | 715/538 |
| 2004/0148296 A1 * | 7/2004 | Schaepe et al. | | 707/100 |
| 2004/0209230 A1 * | 10/2004 | Beu et al. | | 434/72 |
| 2004/0230572 A1 * | 11/2004 | Omoigui | | 707/3 |
| 2005/0010599 A1 * | 1/2005 | Kake et al. | | 707/104.1 |
| 2005/0086188 A1 * | 4/2005 | Hillis et al. | | 706/50 |
| 2005/0108001 A1 * | 5/2005 | Aarskog | | 704/10 |
| 2005/0203924 A1 * | 9/2005 | Rosenberg | | 707/100 |
| 2005/0209983 A1 * | 9/2005 | MacPherson | | 707/1 |
| 2005/0210009 A1 * | 9/2005 | Tran | | 707/3 |
| 2006/0026147 A1 * | 2/2006 | Cone et al. | | 707/3 |
| 2006/0053382 A1 * | 3/2006 | Gardner et al. | | 715/764 |
| 2006/0106847 A1 * | 5/2006 | Eckardt et al. | | 707/101 |
| 2006/0167835 A1 * | 7/2006 | Aggarwal et al. | | 707/2 |
| 2006/0173824 A1 * | 8/2006 | Bensky et al. | | 707/3 |
| 2007/0005520 A1 * | 1/2007 | Eick et al. | | 706/12 |
| 2007/0180392 A1 * | 8/2007 | Russo | | 715/765 |
| 2007/0239706 A1 * | 10/2007 | Zhang et al. | | 707/5 |
| 2007/0271524 A1 * | 11/2007 | Chiu et al. | | 715/767 |
| 2008/0134060 A1 * | 6/2008 | Albrecht et al. | | 715/762 |
| 2009/0024962 A1 * | 1/2009 | Gotz | | 715/838 |
| 2009/0063557 A1 * | 3/2009 | MacPherson | | 707/103 R |
| 2010/0106752 A1 * | 4/2010 | Eckardt et al. | | 707/805 |
| 2010/0312766 A1 * | 12/2010 | Horn | | 707/737 |

FOREIGN PATENT DOCUMENTS

| | | |
|---|---|---|
| EP | 0 698 844 A | 2/1996 |
| EP | 0 723 217 A | 7/1996 |

OTHER PUBLICATIONS

VIM: A Framework for Intelligence Analysis; T. Alan Keahey and Kenneth C. Cox; Oct. 10, 2004; 2 pages.

Information Triage with TRIST; XP-002379317; David Jonker; William Wright; David Schroh; Pascale Proulx; and Brian Cort; Oculus Info Inc., Toronto, Canada; May 4, 2005; 6 pages.

Advances in nSpace—The Sandbox for Analysis; XP-002379318; William Wright; David Schroh; Pascale Proux; Alex Skaburskis and Brian Cort; Oculus Info Inc., Toronto, Canada; 2 pages.

Jonker D et al: "Information Triage with Trist" 2005 International Conference on Intelligence Analysis, [Online] May 4, 2005, XP002379317....

Wright W et al: "Advances in nSpace—The sandbox for Analysis" 2005 International Conference on Intelligence Analysis, [Online] May 4, 2005, XP002379318.

Keahey T A et al: "VIM: A Framework for Intelligence Analysis" Information Visualization, 2004. Infovis 2004. IEEE Symposium on Austin, TX, USA Oct. 10-12, 2004 . . . XP010769600.

Keahey T H and Eick S G: "A visualization architecture for intelligence analysis" Visualization and DAta Analysis 2004, Proceedings of Spie..XP002464739.

Kurtenbach G et al: Issues in Combining Marking and Direct Manipulation Techniques: UIST '91. 4th annual Symposium on user interface . . . XP000315074.

Bartram L et al: "The continuous zoom: a constrained fisheye technique for viewing and navigating large information spaces" UIST '95. 8th Annual symposium on . . . XP002448322.

Sarkar M et al Association for Computing Mahiner: "Graphical Fisheye Views of Graphs" Striking a Balance. Monterey, May 3-7, 1992 . . . XP000426810.

European Search Report, Munich, Jan. 21, 2008.

European Search Report, EP 10 01 1948.6, issued Aug. 8, 2011.

VIM: A Framework for Intelligence Analysis, Keahey, T.A. et al., pp. 1-2, Oct. 10, 2004.

Bringing Order to the Web: Automatically Categorizing Search Results, Chen, Hao et al., XP-001090172, Apr. 2000 , pp. 1-8.

Information Triage with TRIST, Jonker, David et al., XP 002379317, pp. 1-6, 2005.

Advances in nSpace—The Sandbox for Analysis, Wright, William , XP 002379318, 2 pages, Apr. 5, 2005.

A Visualization Architecture for Intelligence Analysis, Keahey, T. Alan et al., XP 002464739, 2004, pp. 1-11.

Partial European Search, Apr. 4, 2011, Oculus Info Inc.

Jonker D. et al: "Information Triage with Trist", 2005 International Conference on Intelligence Analysis, [Online] May 4, 2005, XP002379317, McLean, VA . . . .

Wright W. et al: Advances in nspace—The Sandbox for Analysis:, 2005 International Conference on Intelligence Analysis, [Online] May 4, 2005, XP002379318, McL . . . .

Keahey T. A. et al: "VIM A Framework for Intelligence Analysis", Information Visualization, 2004. INFOVIS 2004. IEEE Symposium on Austin . . . .

Keahey T.H. and Eick S.G.: A visualization architecture for intelligence analysis:, Visualization and Data Analysis 2004, Proceedings of Spie . . . .

Chen H. et al Association for Computing Machiner: "Bringing order to the Web: Automatically Categorizing Search Results", CHI 2000 Conference . . . .

EP 0 698 844 A2 (IBM [US]) Feb. 28, 1996 *col. 2, line 20-line 25**colunm 5, line 31-line 43*.

Accot J et al: "More than dotting the i's—foundations for crossing-based interfaces", CHI 2002 Conference proceedings . . . XP001099402..whole document.

EP 1 026 574 A2 (Sharp KK [JP]) Aug. 9, 2000 *abstract*.

European Search Report dated Apr. 4, 2011.

* cited by examiner

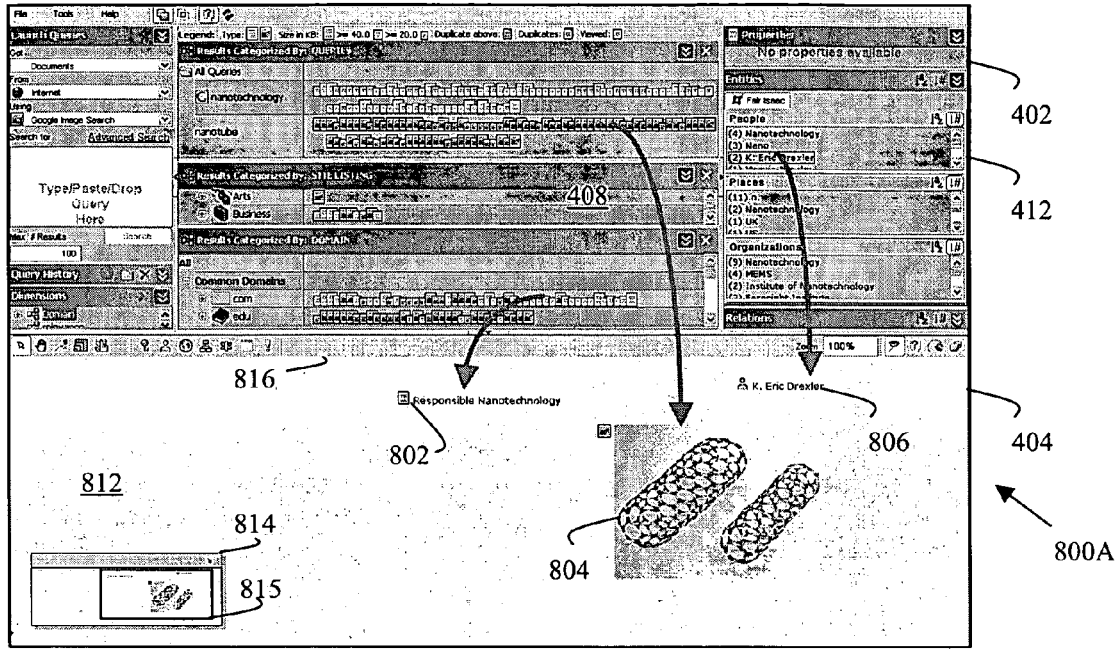
FIG. 8A
FIG. 8B
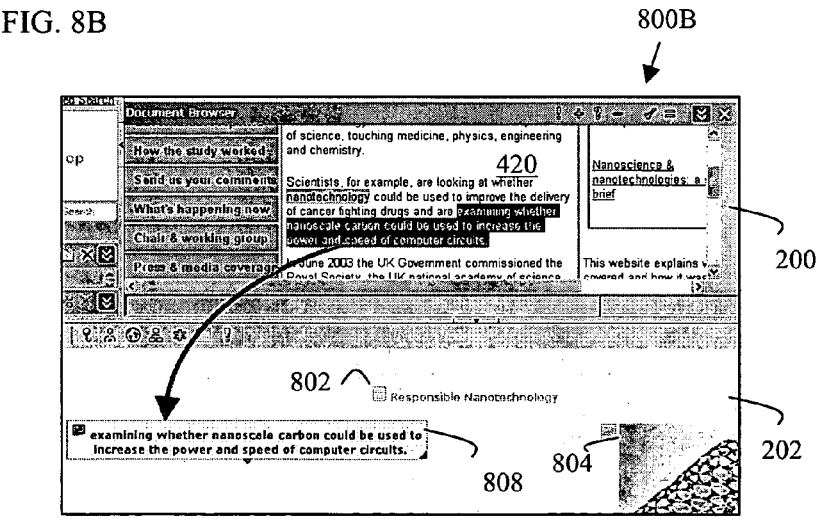

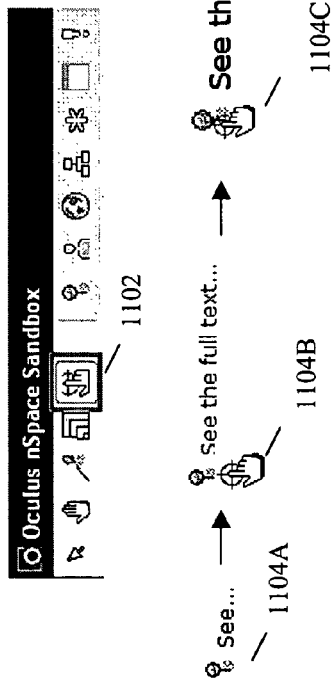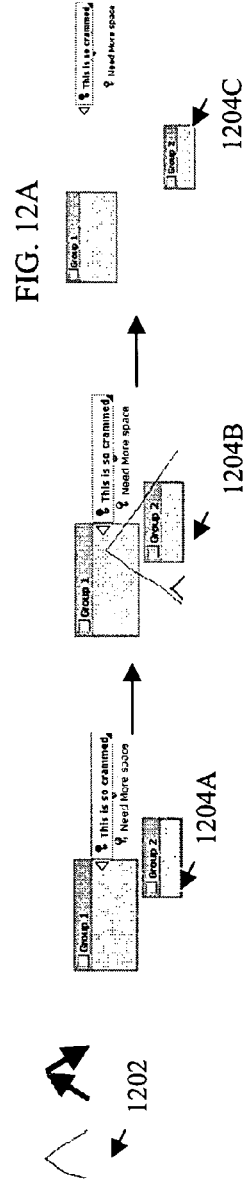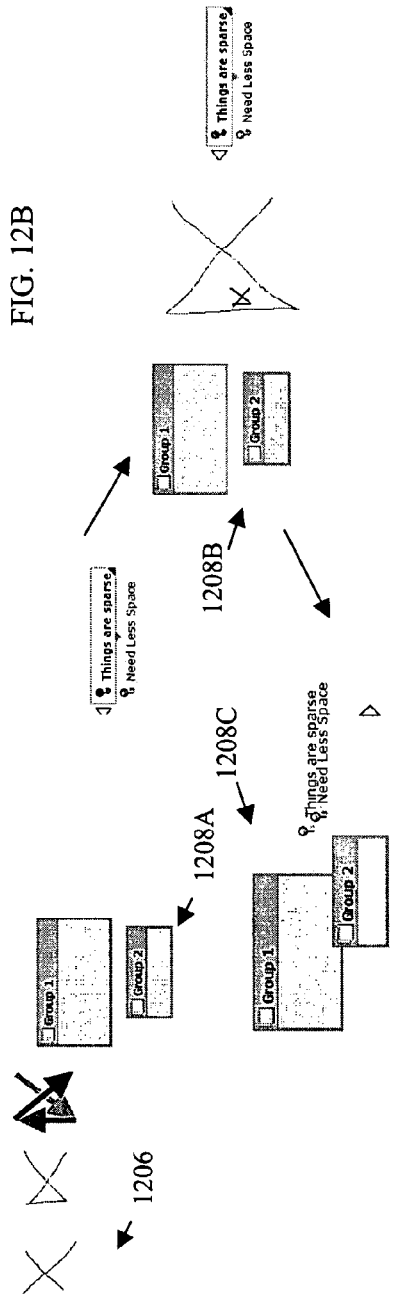
FIG. 11
FIG. 12A
FIG. 12B

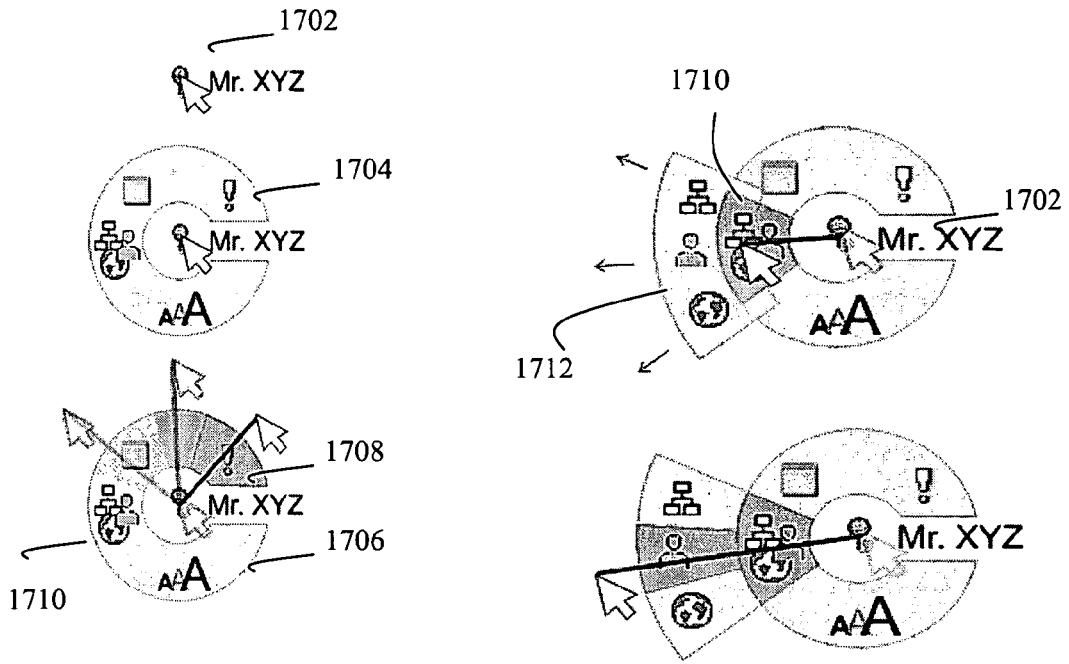
FIG. 17A
FIG. 17B
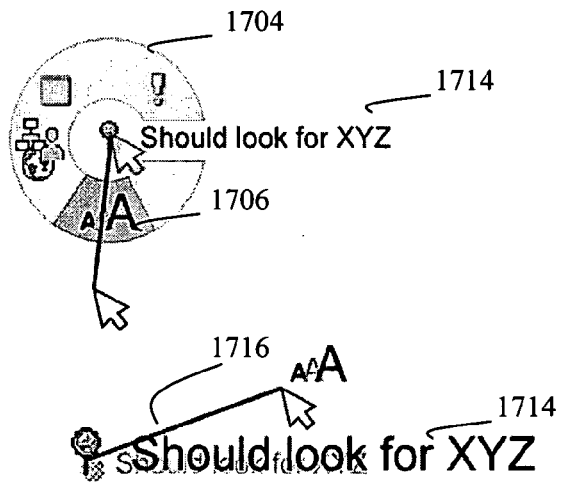
FIG. 17C

SYSTEM AND METHOD FOR INTERACTIVE VISUAL REPRESENTATION OF INFORMATION CONTENT AND RELATIONSHIPS USING LAYOUT AND GESTURES

CROSS REFERENCE

This application claims the benefit of U.S. Provisional Application No. 60/631,597, filed Nov. 30, 2004, U.S. Provisional Application No. 60/631,600, filed Nov. 30, 2004, U.S. Provisional Application No. 60/706,001, filed Aug. 8, 2005, and U.S. Provisional Application No. 60/706,002, filed Aug. 8, 2005, each of which is incorporated herein by reference.

FIELD OF INVENTION

This application relates to information analysis and more particularly to a system and method for interactive visual representation of information content and relationships using layouts and gestures for the application of analysis methodologies. A visualization tool is provided which facilitates both ad-hoc and more formal analytical tasks with a flexible and expressive thinking environment. The tool provides a space focused on 'Human Interaction with Information' and a space for enabling evidence marshalling and sense making. Capabilities of the tool include put-this-there cognition, automatic analysis templates, and gestures for the fluid expression of thought and scalability mechanisms to support large analysis tasks.

BACKGROUND OF INVENTION

Analyst work is not sequential, and moves back and forth, from one stage to another, across multiple tasks at a moment's notice. There is a need for an integrated approach for supporting analysts [Wright, Kapler, 2004]. An integrated work environment should provide a common visual vocabulary for analytic work, creating a mixed-initiative environment for the whole analysis workflow and a workspace ready for collaboration. It also needs to be a test bench into which new technologies can be integrated. Primarily, it is the cognitive space where the analyst will see, and interact with, more information, more quickly, with more comprehension.

The large number of potential context switches between tools/mediums constitutes another kind of friction or overhead observed. Based on the observed process of building large "shoeboxes" in Word, (i.e. pasting sequentially usually in a single Word document all bits that appear relevant to the whole task), one could infer that evidence marshalling is particularly difficult. It must be hard to get the big picture by looking at pages and pages of text. The analyst probably relies heavily on memory to connect the dots. Related to this is the lack of observable use of various analytical methods (e.g. inference networks, ACH, models, etc.). Considering the relative short-term tasks and the difficulty of building say inference networks or any kind of analytical charts in Word, it is not particularly surprising. In the end, this seems to indicate that analysis content (hypothesizing, fleshing out hypotheses with evidence proving and refuting them, corroborating, evaluating the diagnosticity of the evidence, and assessing which hypotheses are most likely, etc.) is something that happens mostly in the analyst's head.

Many researchers have warned about the possible consequences of doing analysis primarily in one's head. The analyst is more prone to human cognitive biases and it may not be as easy to collaborate and to communicate about the analytical process and how the conclusions were reached than if analytical methods were used and so made the thinking explicit. The well-known analysis "bathtub" curve [Rose, 1996], showing that most of the analyst time is spent in information retrieval (IR) and report creation and almost relatively no time doing analysis, was replicated.

Therefore, a solution seeking to address one or more of these shortcomings is desired.

BRIEF DESCRIPTION OF THE DRAWINGS

A better understanding of these and other embodiments of the present invention can be obtained with reference to the following drawings and detailed description of the preferred embodiments, in which:

FIGS. 8A and 8B illustrate representative screen shoots respectively of the tool showing drag and drop features;

FIGS. 11 to 15C are representative screen shots showing gesture-based interfaces for the tool;

FIGS. 17A-17C are representative screen shots showing a radial menu interface for the tool;

SUMMARY

Figure 1:
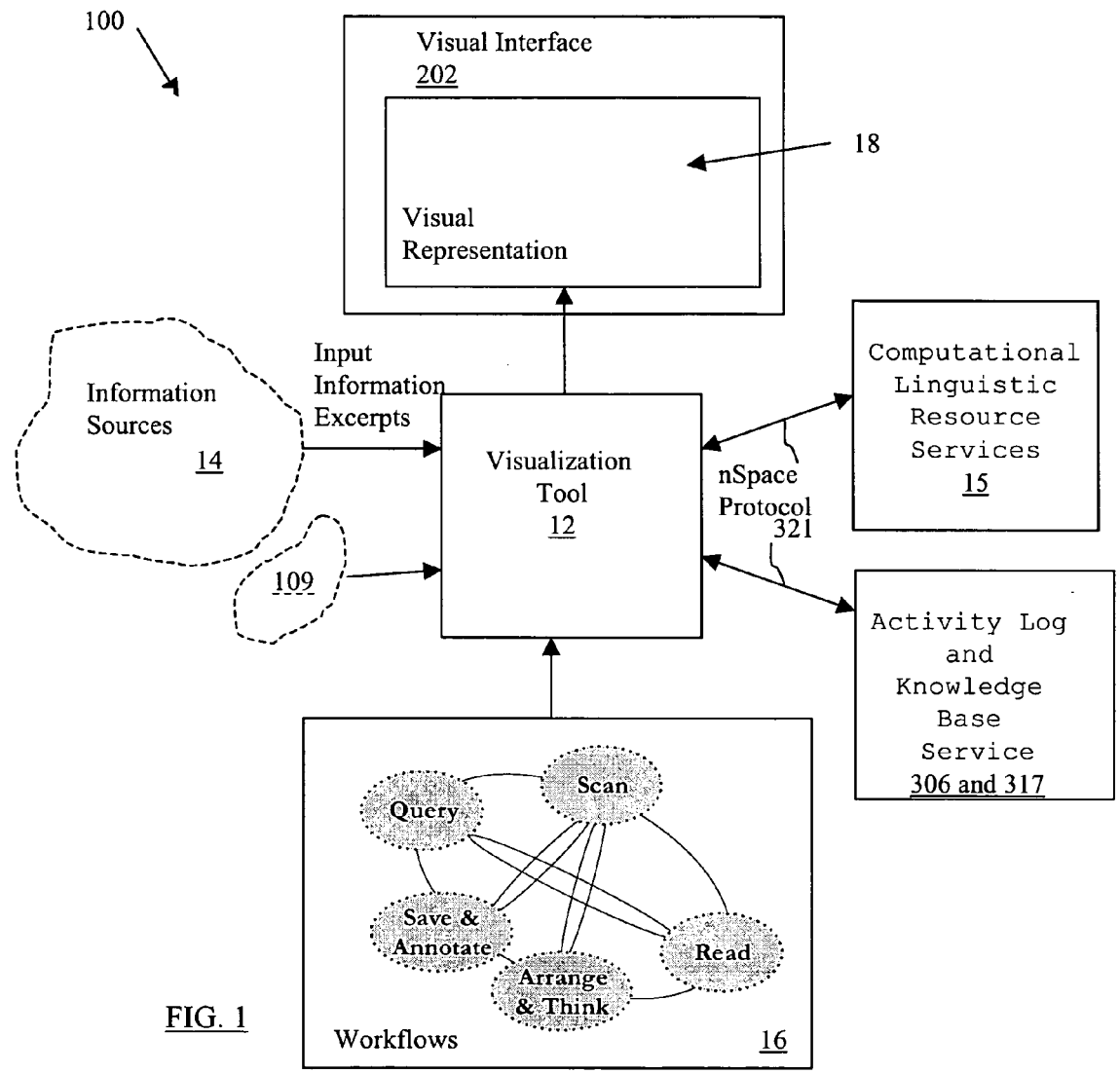
FIGS. 1 and 2 are block diagrams of a data processing system for a visualization tool in accordance with an embodiment.

In accordance with aspects of the invention, there is provided a system, method for interactive visual representation of information content and relationships using layouts and gestures. A visualization tool is provided which facilitates both ad-hoc and more formal analytical tasks as a flexible and expressive thinking environment. The tool provides a space focused on 'Human Interaction with Information' and enabling evidence marshalling. Capabilities of the tool include put-this-there cognition, automatic analysis templates, and gestures for the fluid expression of thought and scalability mechanisms to support large analysis tasks. Aspects of the system and method may be provided via computer software. In one embodiment, there is provided a system for information analysis comprising: a data processing system configured to execute a visualisation tool comprising a user interface for marshalling evidence, said user interface configured to: provide a space within which to visually represent information for visual cognition in accordance with at least one spatial arrangement directed by a user to define said evidence; and receive user input to define the information comprising information excerpts and analysis content and to direct the visual representing of the information.

DETAILED DESCRIPTION

Data Processing System for Tool Implementation

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the Java computer programming language (or other computer programming languages in conjunction with C/C++). Any limitations presented would be a result of a particular type of operating system, computer programming language, or data processing system and would not be a limitation of the present invention.

The tool as described herein is a flexible and expressive thinking environment that supports both ad-hoc and more formal analytical tasks. Its function is to support analysts as the orchestrators and directors of the analytic process, and is literally focused on "Human Interaction with Information". The tool provides a fluid and flexible medium of analysis and expression It integrates the acts of building, controlling and testing hypotheses, resulting in a natural thinking process. This is optimized by improving efficiency in interaction and control through reducing friction in the interface. The tool supports evidence marshalling as a first step to supporting working with the observations. Analysts can define layouts to reflect thought processes and assumptions, viewing multiple dimensions of the problem through the use of connected views. These linked, multi-dimensional views speed scanning of information by an order of magnitude. Capabilities of the tool include, such as, but not limited to: put-this-there cognition; automatic analysis templates; gestures for the fluid expression of thought; and scalability mechanisms to support large analysis tasks.

The tool is preferably part of an integrated cognitive space where analysts will see and interact with massive amounts of information, more quickly, with more comprehension. The information analysis tool may be integrated with an information retrieval and handling tool to define such a space. The assignees of the present invention have termed this space "nSpace" (a trade mark of Oculus Info Inc.) and provide an integrated multi-dimensional visual information tool TRIST™ in combination with an interactive information analysis tool Sandbox™ as descried herein. The term "shoebox" (e.g. container) is used to describe the information that has been collected by an analyst. This information comes from several sources and incorporates various types of media. The process of building and organizing a shoebox is known as evidence marshalling. This task is difficult due to the massive amounts of information involved, making it difficult to understand the big picture by looking at all the evidence. Many analysts perform their evidence marshalling in word processing documents such as Microsoft Word™, which is not intended for such a purpose. The analyst is forced to rely heavily on personal memory to connect the concepts embedded in separate information pieces of the information set considered.

Currently, many analysts end up printing their shoebox so they can spread out the pages and mark them up with highlighter ink. This method is not only impractical for large amounts of information, but also completely avoids various existing analytical methods (e.g. inference networks, ACH, models, etc.). Considering the relatively short-term tasks studied and the difficulty of building inference networks or other analytical charts in Word™, it is not particularly surprising. In the end, this seems to indicate that analysis (hypothesizing, fleshing out hypotheses with evidence proving and refuting them, corroborating, evaluating the diagnostic value of the evidence, and assessing which hypotheses are most likely, etc.) is something that happens currently without the aid of visual computer-based tools.

Many researchers have warned about the possible consequences of doing analysis primarily in one's head. The analyst is more prone to human cognitive biases, and causing difficulty in collaborating and communicating about the analytical process. The thinking process is not made explicit, making it harder to explain how conclusions were reached than if formal analytical methods were used. An analysis system such as the tool 12 offers a flexible organization support for thoughts and information relevant to the analysis, encourages making analytical thinking explicit, facilitates the application of various analytical methods, scales to large amount of information and thinking, makes it easier to keep more of that information and thinking available to working memory at once, and increases analytical performance by reducing friction points and overhead that steal time from analysis. Such a system should make a significant improvement to quality and/or easy of analysis by reducing the impacts of human cognitive biases, increasing the volume and complexity of information used in the analysis, and facilitating communication and collaboration.

Referring to FIG. 1, a visualization data processing system 100 includes a visualization tool 12 for processing a collection of information sources 14 (documents, web pages, images, text, etc.) for extracting information excerpts to present as a representation 18 of the information on a visual interface 202. The information sources 14 can be combined with selected user workflows 16 by the tool 12, along with a generated information excerpt region, to generate an interactive visual representation 18 on the visual interface (VI) 202 of the information excerpts. Management of the information sources 14 and workflows 16 are driven by user events 109 of a user (not shown) via a user interface 108 (see FIG. 2) during interaction with the visual representation 18. Additionally, the tool 12 interfaces via a protocol (nSpace protocol 321) to various Web services (e.g. computational linguistic resource services 15 and activity and knowledge base service 306 and 317) described further below.

Figure 2:
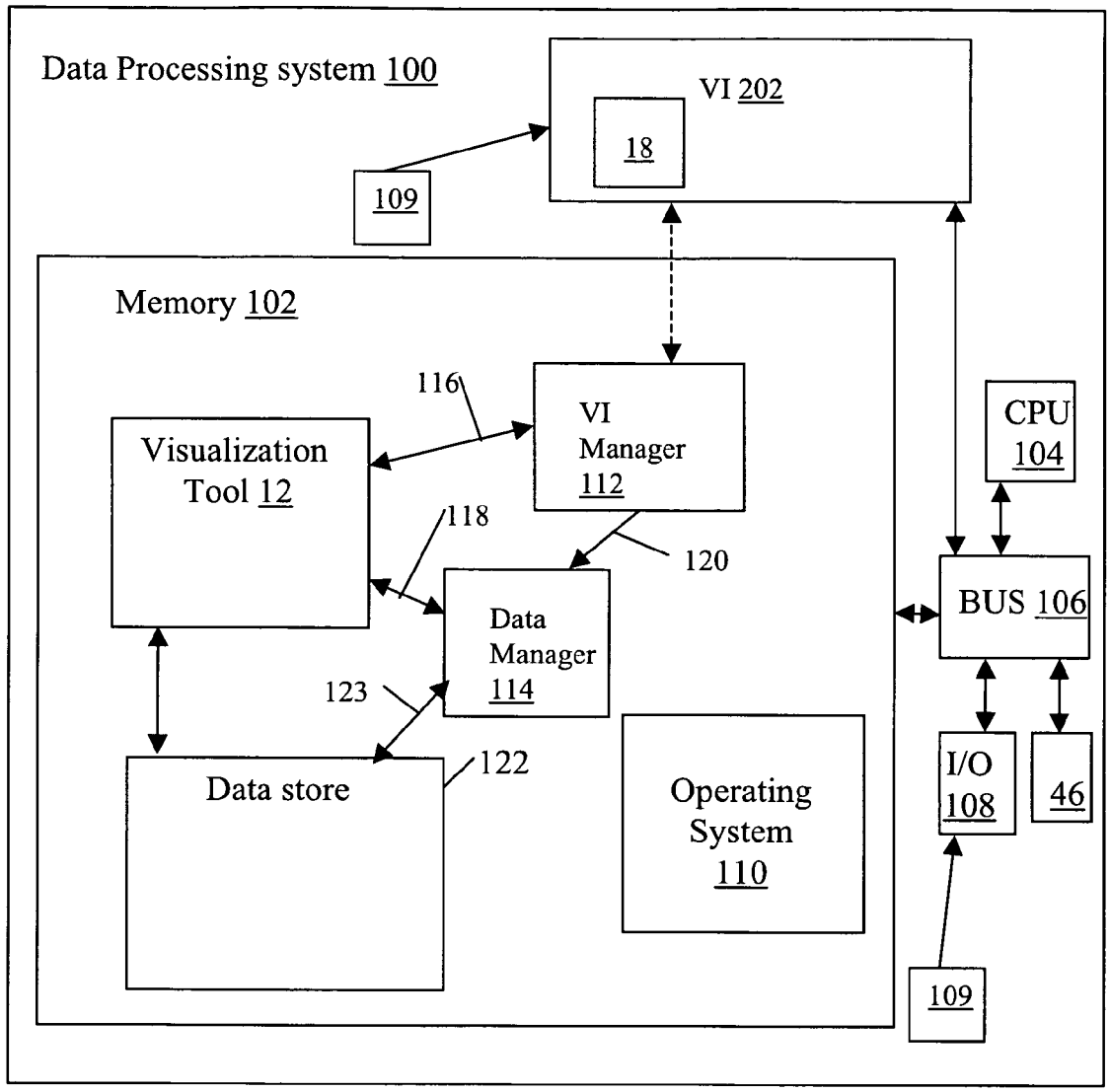

Referring to FIG. 2, a data processing system 100 has the user interface 108 for interacting with the tool 12, the user input devices 108 being connected to a memory 102 via a BUS 106. The input devices 108 are coupled to a processor 104 via the BUS 106, to interact with user events 109 to monitor or otherwise instruct the operation of the tool 12 via an operating system 110. The user input devices 108 can include one or more user input devices such as but not limited to a QWERTY keyboard, a keypad, a trackwheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and&or software such as, by way of example only, magnetic disks, magnetic tape, optically readable medium such as CD/DVD ROMS, and memory cards In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, Me tool 12 interacts via link 116 with a VI manager 112 (also known as a visualization renderer) of the system 100 for presenting the visual representation 18 on the visual interface 202. The tool 12 also interacts via link 118 with a data manager 114 of the system 100 to coordinate management of the information sources 14 and associated information excerpts from data files or tables of a data store 122 of the memory 102. It is recognized that the sources 14 and related information excerpts could be stored in the same or separate files or tables of the data store 122, as desired. The data manager 114 can receive requests for storing, retrieving, amending, or creating the sources 14 and excerpts via the tool 12 and/or directly via link 120 from the VI manager 112, as driven by the user events 109 and/or independent operation of the tool 12. The data manager 114 manages the sources 14 and excerpts via link 123 with the tables 122. It is recognized that the data store 122 could also contain predefined or otherwise stored information excerpts already generated by the tool 12, as further described below. Accordingly, the tool 12 and managers 112, 114 coordinate the processing of sources 14, excerpts, retrieval and implementation of workflows 16 with user events 109, with respect to the content of the screen representation 18 displayed on the visual interface 202.

Figure 3:
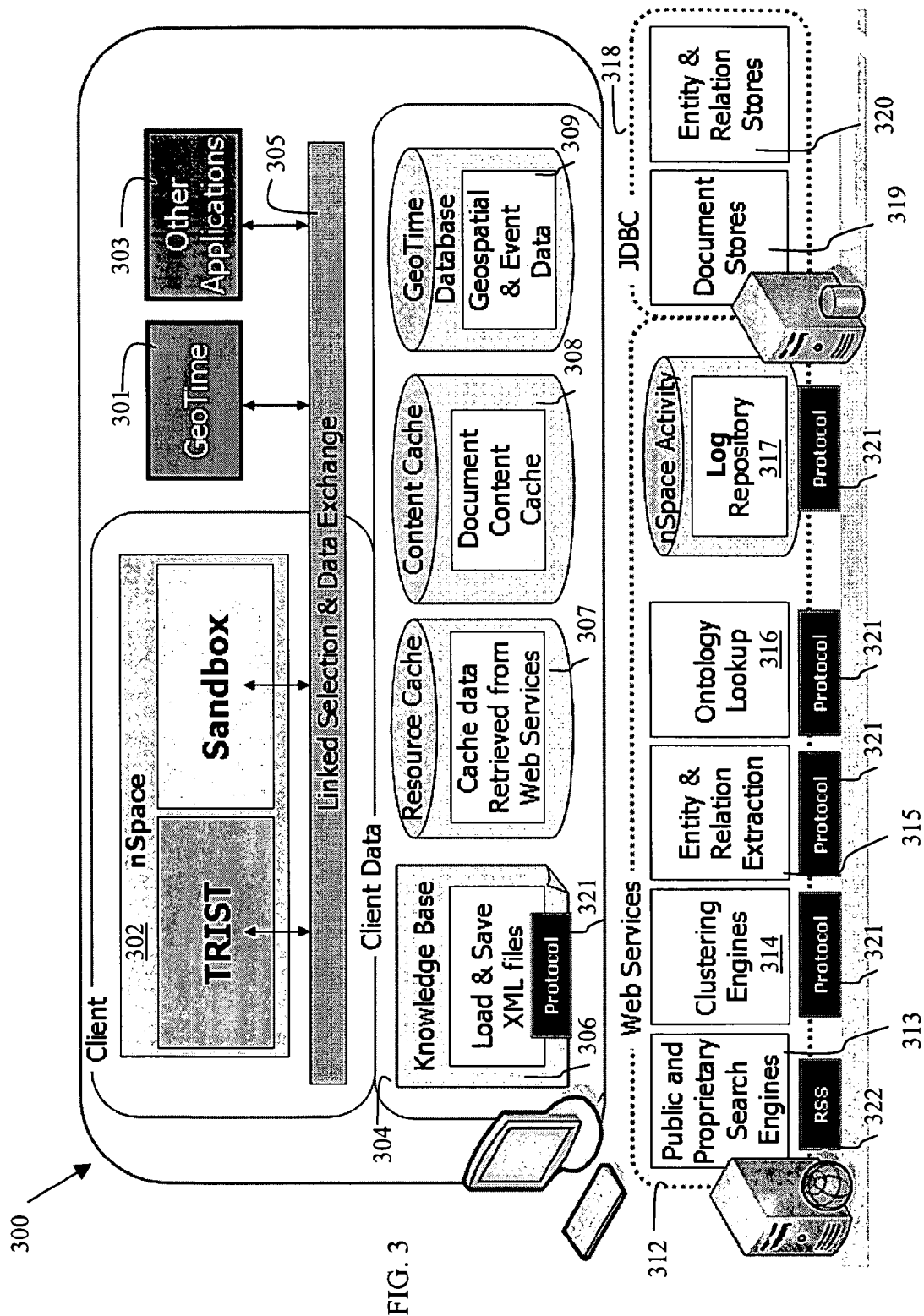
FIG. 3 is a block diagram of the visualization tool.

FIG. 3 is a block diagram of computer system architecture in accordance with an embodiment of the visualization tool 12. System components 300 of tool 12 comprise a client application 302 providing an integrated information retrieval and analysis tool nSpace comprising TRIST and Sandbox respectively, optional application components such as GeoTime™ 301 (GeoTime is a trade mark of Oculus Info Inc.) and other application components 303 and client data components 304. A link selection and data exchange mechanism 305 couples the nSpace client application components of TRIST and Sandbox and may be used to couple to the optional additional applications 301 and 303. Client data components 304 comprises nSpace knowledge base 306, resource cache 307 of cached data retrieved from Web services 312, content cache 308 of document content, and optionally, a GeoTime database 309 of geospatial and temporal data that is associated with events and entities as well as connections between those data. The GeoTime application 301 and database 309 are described in U.S. patent application Ser. No. 11/078,330 filed Mar. 14, 2005 and entitled, "System And Method For Visualizing Connected Temporal And Spatial Information As An Integrated Visual Representation On A User Interface" the contents of which are incorporated herein by reference.

nSpace client application 302 is coupled via middleware architecture (not shown) to Web Services 312 and to JDBC connected systems 318. Web services 312 comprise ad hoc and/or corpus services, such as, but not limited to, ontology services 316, entity extraction services 315, clustering services 320, entity and relation extraction services 315, clustering engines 314 and public and proprietary search engines 313. JDBC connected systems 318 comprise document stores 319 and entity and relation stores for persisting query results, for example.

Ontology services 316 such as an ODP directory, WordNet or Library of Congress catalogue provide information for defining dimensions with which to categorize query results or define queries. Entity extraction services 315 such as Cicero Lite™ from Language Computer Corporation extract entity information, contained in the results such as but not limited to people or places, using semantic analysis. Clustering engines 314 and entity and relationship extraction services 315 such as provided by Fair Issac operate on "content" to extract meaning (noun-phrases and their relationships, etc.) to gain an understanding of the document and return keywords to bin (categorize) a body of documents such as those previously identified by the results of a query. Clustering may be performed to generate automatic categories or dimensions.

The nSpace activity log and knowledge base components 306 and 317 are used to store respectively data that the analyst is working with and actions the analyst performs while working with this data. The activity log and knowledge base 306 are maintained to model the user and analyst activity is published as a Web Service 317 as also shown in FIG. 1 using the nSpace protocol 321. Analyst activity (e.g. XML data stream about analyst creation and usage of queries, documents, fragments, snippets, entities, relations, ontologies, and analytical content such as notes and annotations, assertions, templates context etc.) may be published to other services such as AME of Sarnoff Corporation. Such activity information may be analyzed to see interests in documents, entities, relations. Examining the activity in context indicates interests and/or biases. The tool 12 may be adaptive to an analyst's preferences in accordance with the activity information gathered over time. Tool 12 may be configured to automatically perform certain actions to place information into Sandbox. As confidence in advanced features is inferred from the activity data, tool 12 may suggest or automatically apply certain analytical templates to visualize information in Sandbox.

An nSpace protocol 321, as described further herein below, may be used for at least some Web services communications such as publishing analyst activity data or communicating with computational linguistic resource services 15 such as services 314 and 315. Other standard protocols such as RSS (Really Simple Syndication) 322 may be used for Web services communications. The knowledge base and activity log 306 and 317 use a structured XML schema. This schema includes a high level analyst task characterization (e.g. assertions, templates, query history, query results, extracted entities used, snippets, user defined dimensions, discovery clustered dimensions, etc.) as well as detailed descriptions. These are all saved and then made available in the nSpace schema. The knowledge base and activity log data are used to provide a rich analytic activity stream for automated system initiatives. Additional data in the store may include (but is not limited to):

terms, entities, events and relationships found from the results or entered by the analyst including attributes of these items; and dimensions, both user defined and automatically generated.

These data reference each other to show dependencies and/or links and relationships. In addition to the analyst's data, knowledge base 306 also stores information on the state of the application task (i.e. current use of the tool 12) for analysis of a respective query and information source 14 set. By storing the state associated with a task the analyst can come back to the task and find the most recent context of the work intact. This allows the analyst to close the application or to work on several separate tasks and avoid losing context.

As shown in FIG. 3, nSpace (TRIST and Sandbox) components 300 use a multi-tier architecture for scalability and ease of deployment. Web services standards are implemented to encapsulate the services in each tier. The client application accesses the activity log and knowledge base (306 and 317) through the client data (application services) layer. Other background application processing, such as search execution, can be offloaded to reduce load on the client. To improve performance, the Sandbox interface 404 component may be implemented to allow for hardware acceleration as well as both 2D and 3D forms of expression in one single workspace. A visualization rendering platform may support a 100% Pure Java mode, or an optional acceleration mode that leverages OpenGL hardware for 2D and 3D graphics. Sandbox can be a Java application that utilizes a graphical library for visualizing the layout of information.

Client application 302 is concerned primarily with presenting information and allowing interaction in such a way as to aid the analyst in his or her task. The TRIST and Sandbox client application 302 maintains a global state object (not shown) that holds information on a user's current context for all the tasks the analyst may be working on. This state object can be persisted in the store 306 as a snapshot of the TRIST and Sandbox contents in the representation 18. Objects may be serialized using XML or other languages and techniques such as will be apparent to those of ordinary skill in the art. In addition to being available for the next use of the application, past snapshots can be reloaded to retrieve saved milestones or simply to review past contexts perhaps to take up old search trails that the analyst may have left in favour of others.

The global state object comprises task state objects (not shown). These correspond to the application's context for each task that the analyst is working on. The active task dictates the currently visible features and results in the representation 18 through a number of view states (not shown), which correspond roughly to different panels of a graphical user interface (GUI) of representation 18 (see FIG. 4). Collectively the state records such aspects of the application such as but not limited to:

Position, size and emphasis of sandbox components
Parenting of sandbox components
Text of user annotations and notes
Link ones and source-target pairs
Supporting/Refuting assignment and weight of assertion evidence The state objects work in close concert with a data pool providing a global repository for data objects (representing the document/Web pages, relevant portions of the documents/Web pages, analytical content, and links with the information sources 14 in general). Centrally maintaining data objects that are retrieved from the knowledge base store 306 allows the application to use memory more efficiently, since each object may be allocated only once. This is important if the application is to handle large result sets. Also this simplifies the task of linked selection The data pool is independent of state, and since it depends only on there being a consistent data store, its contents are re-usable between task state switches, further aiding the performance of the application.

Figure 4:
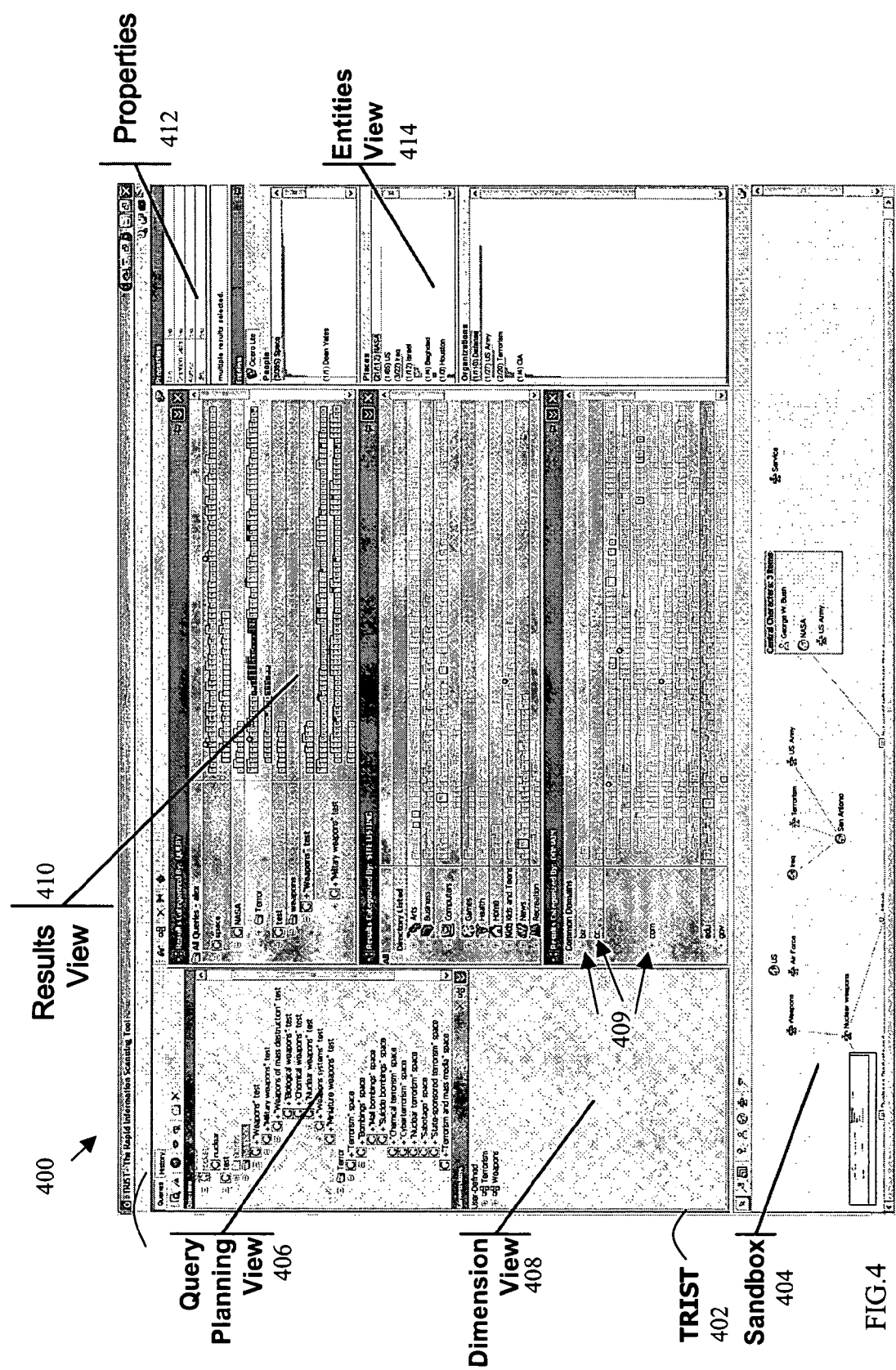
FIG. 4 is a representative screen shot of graphical user interfaces from the tool of FIG. 3 in accordance with an embodiment thereof.

FIG. 4 is a representative screen shot 400 showing an example of a representation 18 (a GUI) of the TRIST and Sandbox client application 302. Screen shot 400 shows interfaces for the tool's two basic components namely a TRIST interface 402 component for interactive multi-dimensional visual representation of information content and properties and an integrated Sandbox interface 404 component for analysis tasks. As noted, together, the TRIST and Sandbox interfaces (402 and 404) provide an interface referred to as "nSpace" (a trade mark of Oculus Info Inc.).

Figure 6:
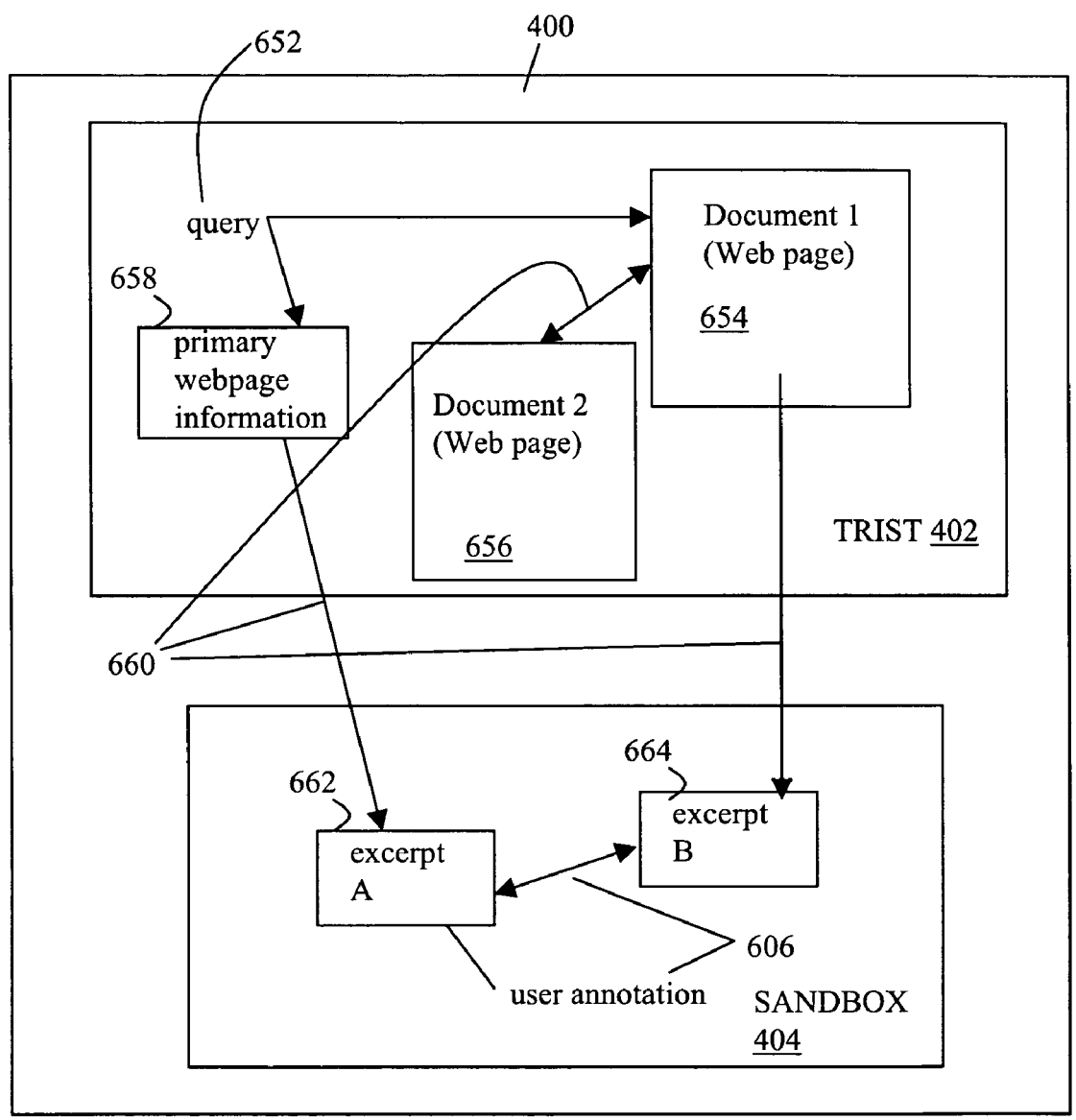
FIG. 6 is a block diagram of example links for documents and queries.

As shown in FIGS. 4 and 6, nSpace is the combination of the multi-dimensional linked views of information sources 14 found in TRIST interface 402 and the cognitive exploration and development mechanisms in Sandbox interface 404, used to represent information excerpts and their interconnections to one another and the respective original sources 14 (as well as interconnections between documents/Web pages). TRIST interface 402 of tool 12 provides a user with an information retrieval system that supports searching, rapid scanning over thousands of search results of information sources 14 (such as but not limited to documents—both text and image—and/or information links—e.g. a Web page), browsing and extracting of information excerpts from the sources into Sandbox interface 404. TRIST interface 402 can include aids to query planning (e.g. view 406) and dimensions (e.g. view 408), a linked multi-dimensional space for result characterization and correlation (e.g. views 410, 412 and 414), and an integrated document/link viewer (not shown). Aspects of TRIST are further described in the present assignee's U.S. Provisional Patent Application No. 60/706,002 filed Aug. 8, 2005 entitled "System and Method for Multi-Dimensional Visual Representation of Information Content and Properties" of Jonker et al. and U.S. patent application Ser. No. 60/706,001, entitled "System and Method for Multi-Dimensional Visual Representation of Information Content and Properties" of Jonker et al. filed on even date herewith and Canadian Patent Application No. 2,500,573, filed Mar. 14, 2005, entitled "Advance in nSpace—System and Method for Information Analysis" of Wright et al. each of which is incorporated herein by reference.

Sandbox interface 404 is a flexible and expressive thinking environment. It facilitates a space literally focused on 'Human Interaction with Information', such that local collections of information excerpts with user attached links, associations, hypotheses, comments, annotations and other inter- and intra-excerpt connections are represented visually in the representation 18. For example, the analysis content of the information excerpts produced through use of Sandbox interface 404 (e.g. assumptions, inferences, evidence tied to hypotheses, explanations) is such that the analysis content is visually linked to the information excerpts and may also be visually linked back to the information sources 14 of the respective information excerpts displayed in Sandbox interface 404 of a representation (e.g. 400). Manipulation and organization of information excerpts is direct and very tactile. Intuitive iconic representations of entities, concepts and relations as information excerpts constitute a common, shared visual vocabulary. This is a visual tong space for considering evidence in multiple frames, designed for user driven tactics in evidence marshalling and sense making like "people-places-organizations-events" cognition or "put-this-there" cognition, as further described below.

Figure 5:
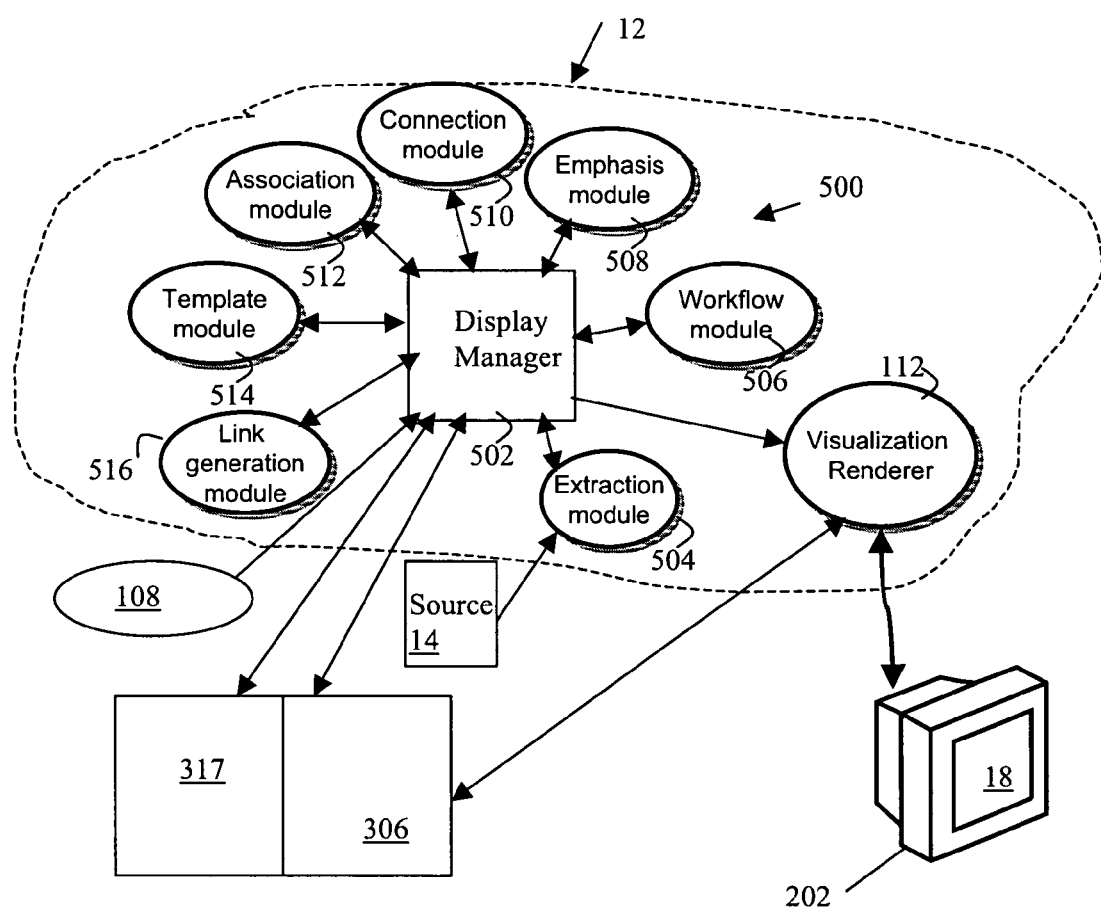
FIG. 5 is a block diagram showing visualization tool modules.

FIG. 5 is a block diagram showing some of the pertinent component modules of tool 12 (client application 302). The tool 12 comprises a plurality of modules 500 for implementing the functionality of the system 100. A display manager 502 coordinates the interaction of associated modules 504-516, among others (not shown), with the user events 109 via interface inputs 108 and activity log and knowledge base 306 and 317 rendering the representation 18 of the analytical content, links to sources 14, and the excerpts and annotations to the Sandbox interface 404 area of the display 202. The tool 12 comprises a connection module 510 for guiding or otherwise enabling the user of the tool 12 to input analytical content for (simultaneous) display (selected or otherwise) with the excerpts in the Sandbox area, a template module 514 for providing a structured layout of the data objects in Sandbox interface 404, an association module 512 for binding two or more excerpts and their related analytical content, a workflow module 506 for coordinating a selected workflow of the tool user, and an emphasis module 508 for altering the display of the excerpt content and form. Tool 12 also comprises an entity extraction module 504 for extracting entities from information sources and a link generation module 516 for constructing or otherwise identifying and defining links between items shown in the views. Tool 12 fiber comprises additional modules (not shown) for implementing TRIST-oriented features such as, but not limited to, modules for various views 406-414, and a document browser module.

FIG. 6 is a block diagram showing relationships between data objects in representative display 400. Keeping track of sources 14 and their related queries is time consuming and thus costly. It does not seem to be the best use of the analyst's core skills and time. The query planning feature of TRIST keeps track of the queries and their results. Any relevant information excerpts saved in Sandbox keeps its link 660 relationship to the document source 14 (e.g. 654, 656) and queries (652, 658) it came from automatically. This task is performed by the link generation module 516. Accordingly, the retrieval history, as well as links of other "at first glance unrelated" excerpts to the shared sources 14, of the information excerpts is associated with the respective excerpts for use by the user of Sandbox interface 404. For example, referring to FIG. 6, the visual links 660 would show that the excerpt A 662 came from query 652, while excerpt B 664 came from a resultant document 654 of the same query 652, therefore showing the connectiveness of the two excerpts A, B 662, 664 other than by the user added analysis content 666 (e.g. annotations—etc.). It should be noted that visual elements of the link 660 are generated by the tool 12 and shown to the user in the representation (e.g. 400) of Sandbox interface 404. Links 660 can be communicated visually using for example text, images, icons, or a combination thereof. It is also recognised that the details for a link 660 could be communicated via audio capabilities of the interfaces 108 to the user (e.g. speaker) either when prompted by the user or on a periodic basis (for example when the particular excerpt is selected by the user). It is also recognised that the visual communication of the links 660 to the user can be "always on" or can be done on a selective basis by the system 100 with or without user interaction.

Figure 7:
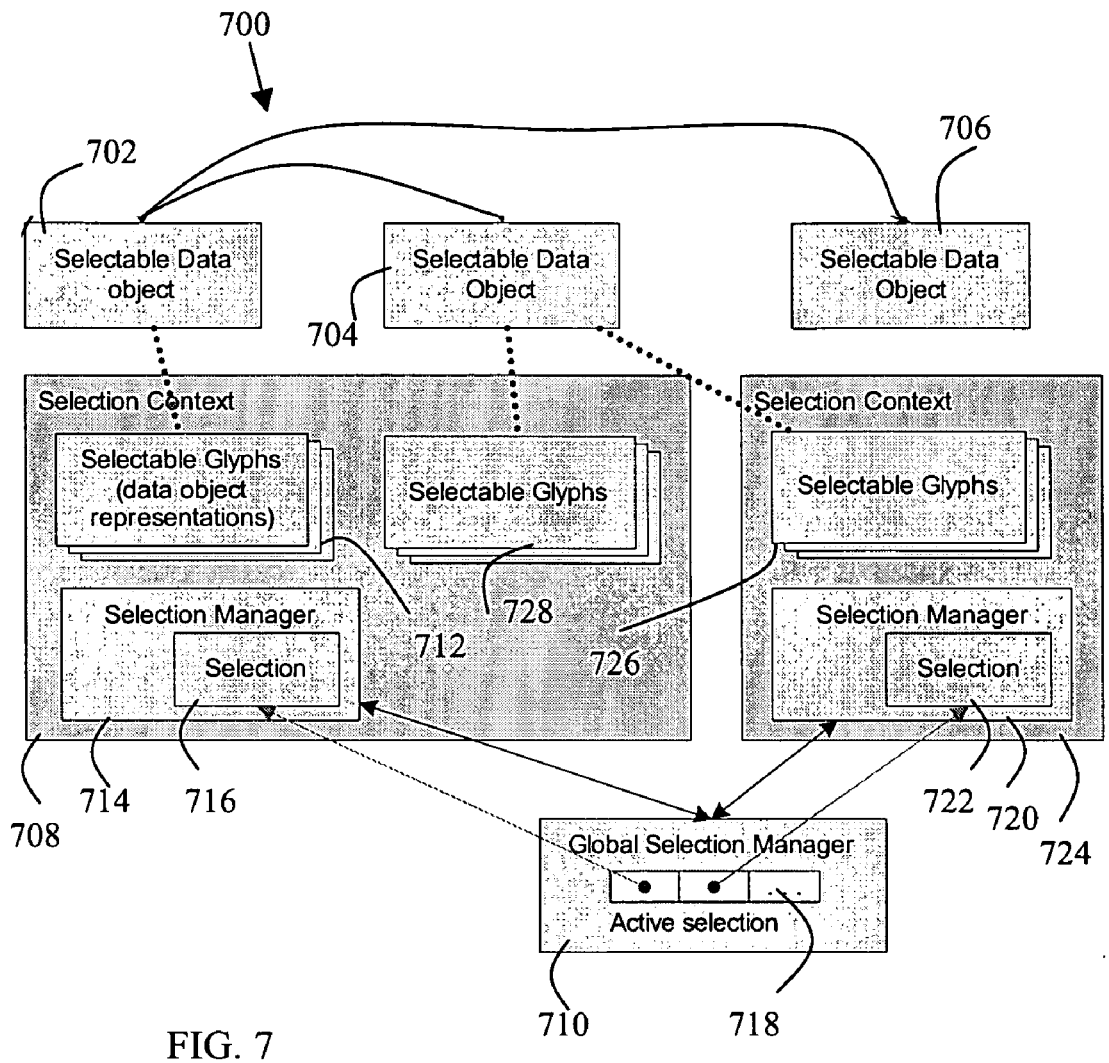
FIG. 7 is a block diagram of a link mechanism in accordance with an embodiment of the visualization tool.

FIG. 7 is a block diagram of a link mechanism in accordance with an embodiment of the visualization tool. The linked generation module 516 of tool 12 helps the analyst find connections between data objects (i.e. documents, entities, queries/results, sandbox items, etc.). Data objects from the data pool are referenced by inheritors of the selectable class. Each selectable object (e.g. 702, 704, 706) represents an underlying data object (e.g. 712, 726, 728) that can be selected by the user, but this does not include a representation. Selectable glyphs are representations of selectable objects. These are the visible aspects of data objects that populate selection contexts (e.g. 708, 724) in the various views of TRIST interface 402 and/or Sandbox interface 404. Roughly, each pane/view (406412) of the TRIST interface 402 and Sandbox interface 404 is associated with a selection manager (e.g. 714, 720) and so defines the selection context of the representation(s) of the data object visible to the user in the repesentation 18. Note that there may be many selectable glyphs to a single selectable object, even within the same selection context.

When a selection (716, 722) of the data object(s) is made by the user, the associated selection manager (e.g. 720) is responsible for generating a list of selected items. These are passed to the global selection manager 710 which then updates other selection contexts (e.g. 708). In this way items representing the selected objects that are selected in one view can be brought to the forefront of other views. Which items are brought to the forefront, or otherwise differentiated to the user of the tool 12 visually from the content of other views, is determined by the representations having a common underlying selectable data object. The visual and interactive aspects of this topic are discussed below. Typically there is only one active selection 718, but the application also allows a selection to be pinned, that is an active selection context is locked so that subsequent selections made in other selection contexts do not clear the pinned selection context's selection. Instead the new selection is added to the global selection manager.

This method of indicating when representations share a common data object is useful for examining a result space. The system 100 also allows for another level of linking between selectable items. Selectable data objects are linked to each other by the application. For example an entity will be linked to the documents that it is found in. The global selection manager described above also communicates this linked selection to the individual selection contexts.

The large number of potential context switches between tools/mediums constitute another kind of friction or overhead observed that could be significantly reduced in nSpace since IR and analysis are performed in an integrated environment.

nSpace Protocol.

The nSpace protocol 321 defines a standard, open XML interface and messages for exchanging data among information resources, objects and processes. A flexible communication architecture works with Web Services, Peer to Peer and Client/Server systems. Local and remote knowledge and agent resources are accessed through an open extensible messaging standard. The nSpace protocol 321 allows different resources to be "plugged-in" as required for customization of a set of components as shown in FIG. 1. The nSpace protocol 321 enables nSpace 300 to be a system of systems, performing in combination with third party computational linguistics, reasoning, hypothesis generation, text-to-concept map algorithms and information retrieval technologies.

The nSpace protocol 321 is extensible. It defines a framework for adding new kinds of messages that can be plugged into existing communications. Heartbeats are special messages designed to provide insight into the system state for a user. Each back-end service publishes Heartbeat messages regularly (e.g. every 10 or 30 seconds). nSpace (or other user-visible applications) subscribes to those Heartbeat messages and can display the status of underlying services to the user at a glance.

The nSpace protocol 321 message format comprises three sections: Properties (version information and message header data), References (the list of resources that are pertinent to the message: documents, entities and relationships (and their data)) and Elements (message-specific data, normally referring to resources in the references section). Message validation uses Namespaces and XML schemas. Resources and elements in messages use unique resource identifiers (URI). Messages in the nSpace protocol 321 use a variety of transports: Web Services (XML exchanged through POST and GET), Publish/Subscribe (XML exchanged through a message server (e.g. XML Blaster or Glass Box) or peer-to-peer network (e.g. TIBCO or Scribe)) and Drag and Drop (XML exchanged through standard Windows and Java Drag-and-Drop).

Put-This-There, Visible, Flexible Cognition

The Sandbox interface 404 provides a space that supports visual thinking, providing alternatives to paper or typical word processing software for thinking activities such as hypothesizing, fleshing out hypotheses with evidence, corroborating, grouping, annotating and prioritizing. Explicit thinking helps ensure more rigorous thinking and thus can reduce the impact of some cognitive biases. Visual thinking can increase an analyst's cognitive span, and also make it easier to communicate and facilitate collaboration. Seeing what is being considered will also show what is not being considered.

Placement, direct manipulation and annotation are used to build and express meaning Placement, a 'put-this-there' process of organization by the analyst is used to encode meaning in the layout. For example, like or related things are placed near each other. Relative importance can be encoded with size. Analysts can write anywhere, group anything, place anything anywhere, add and edit entities (e.g. people, organizations, places, events), add and edit snippets and whole reference documents, images can be used and connections can be made on the visual interface (GUI) by direct interaction of the developer with the tool 12. Thinking can happen quickly and must not be frustrated by a burdensome medium difficult to operate. A minimum of buttons and absence of dialog boxes may be used to create, edit, place, arrange, re-arrange, group, emphasize, highlight and compare. Sandbox interface 404 allows the analyst to spend their time thinking, not interacting with the application.

Figure 9C:
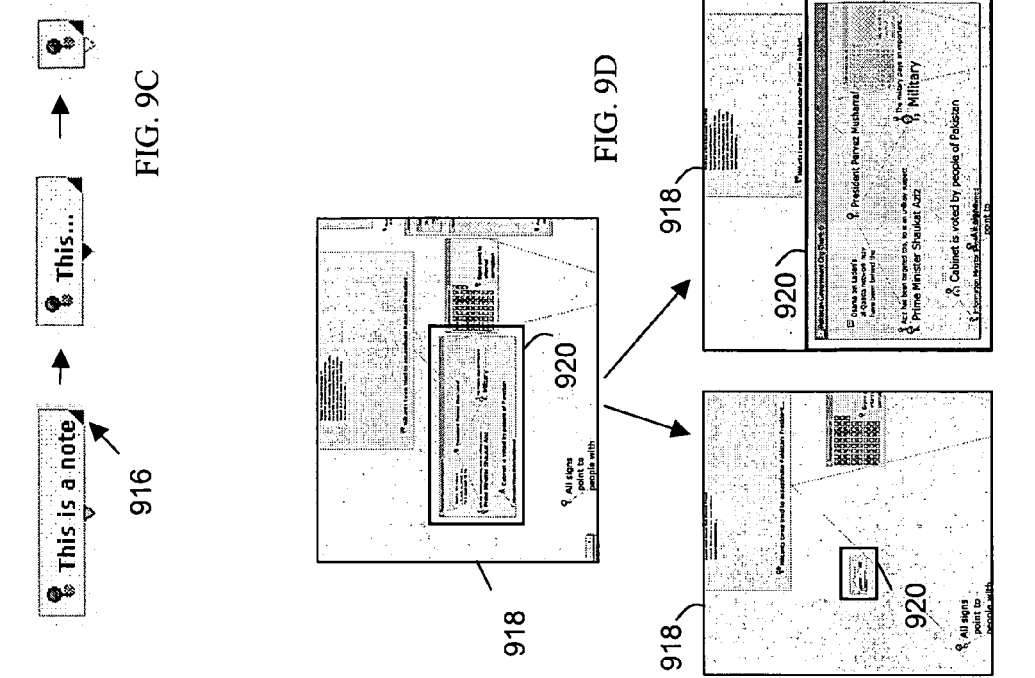
FIGS. 9A-9D are representative screen shots showing working with an interface of the tool.
Figure 9D:
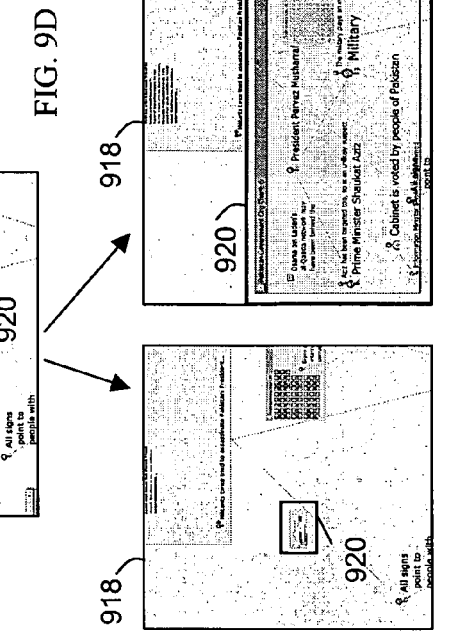
Figure 9A:
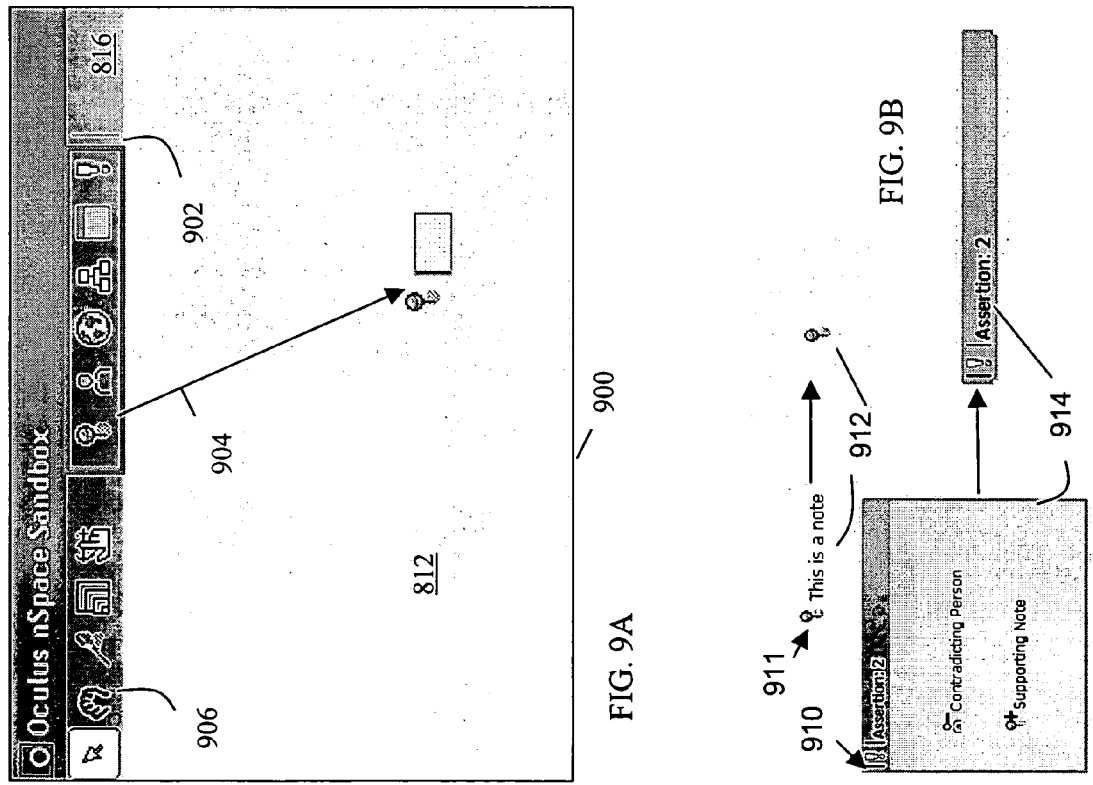

FIGS. 8A and 8B illustrate representative screen shots 800A and 800B respectively of interfaces 402 and 404 showing drag and drop features. The analyst can work with any relevant information, including documents, snippets, images, tables, etc. simply by dragging them into the Sandbox visual area 812 of the GUI. In FIG. 8A document 802, image 804 and an entity 806 are placed in Sandbox using drag and drop from views 408 and 412. FIG. 8B shows a document excerpt 810 dropped in the space 812 of Sandbox interface 404 from an integrated document browser portion 490 of TRIST interface 402. As illustrated ether in other Figures, Sandbox interface 404 comprises a primary workspace 812, all or a portion of which may be visible at any one time in accordance with a zoom parameter selectable by a user as is well known in the art. Preferably, an optional Sandbox thumbnail window 814 provides an overview of the whole space 812 and may contain a rectangle 815 indicating the portion of the whole space visible in the main window space 812. Clicking a portion of 814 zooms space 812 to display that portion and dragging a corner of the contained rectangle adjusts the zoom in the main window to reflect the change. A scroll tool (906 of FIG. 9A) may be used to navigate (e.g. drag) the space 812 as well (e.g. middle mouse button click) or button invocation from a toolbar 816 that provides an interface to fiber actions. Preferably, common slider buttons typically located at a horizontal (bottom) and vertical (right-side) margin of a work or other viewing space in other GUIs are omitted to provide space 812 with a cleaner appearance FIG. 9A shows a portion 900 of interface 404 wherein toolbar 816 is emphasized. Icons 902 represent object types (e.g. notes, entity types (such as, person, place, organisation), group and assertion which can be dragged (as indicated at arrow 904) to add to the space 812. In addition to dragging a note icon, notes can be added anywhere in space 812 by clicking a portion of the space and typing. Enter or click elsewhere to finish the note and optionally begin a new one. Tab indents the portion of the next note.

Figure 9B:
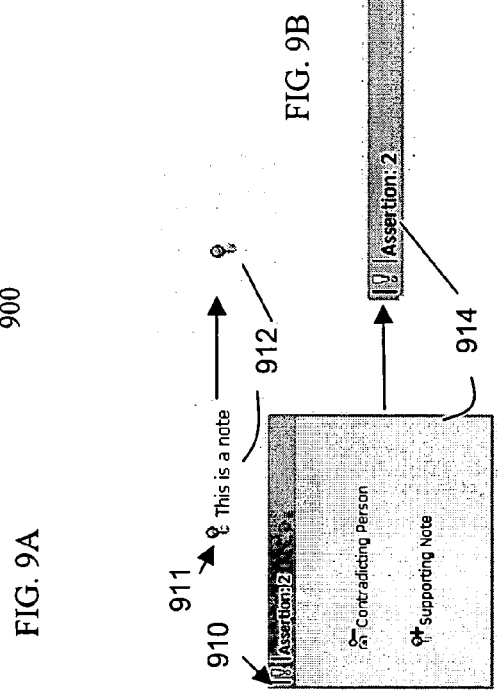

Evidence (i.e. objects representing such) in space 812 can be represented by various levels of detail and in a number of manners. FIGS. 9B-9D represent portions of space 812 showing various level of detail expressing methods. FIG. 9B shows that text (e.g. for a note 912) or content of an object (e.g. a group or assertion 914) can be minimized or hidden with a double click of the object's respective icon 910, 911. FIG. 9C shows that an object's visible text can be altered by dragging a bottom right corner of the object. Emphasis can be used to change the level of detail while keeping visible the meaning encoded in a layout of the workspace. FIG. 9D shows a portion 918 of space 814 where an object 920 is varied in size that is selected to accord with a user's emphasis of the object in the layout in accordance with the user's put-this-there cognition.

References can be made automatically and saved. Time-consuming manual tracking of sources can be minimized. Select a data object in the Sandbox and its source can be highlighted in the TRIST interface 402 portion of the GUI via link module 516, making it easier to check context and scan all the properties or metadata associated with the source. This approach can also reduce the context switches that usually take place when collecting information and later going back its source.

An nSpace session can be saved to a store of system 100, if desired. Saved sessions may be recalled for review or further work.

The Sandbox is a very tactile space with practically no visible interface, just the information and the thoughts. Direct manipulation increases the analyst's productivity by reducing the amount of work needed to perform any action Various automatic layout mechanisms (e.g. lists, grids, circular arrangements) for the information excerpts when contained in the Sandbox area are also available when there is no alternative, more meaningful layout apparent to the user. One of the strengths of nSpace is the flexibility it gives the analyst in pursuing the discovery of useful knowledge (in TRIST) and in following multiple lines of thoughts or Wing multiple ways to marshal the evidence in the Sandbox, all in a very fluid manner.

Analytical Templates-Models Module

Process models (e.g. a manufacturing process) and organizational models (e.g. research organizational chart) provide a structured framework to think about subjects of interest and events. A process model helps explain what is happening, why it is happening and what can be done to change it. An organizational model helps explain how and why an organization operates. Many analysts use and invent methods, models or templates to analyze situations. Models help share and harness analytical knowledge and experience. In addition, different models help the analyst exercise a different point-of-view to help think out of a standard mindset or pre-disposition. When an analyst has a process model in mind what they don't know jumps out at them. Gaps are evident.

The Sandbox interface 404, via template module 514 generally, allows the creation and use of analytical templates to support various concurrent ways of thinking about a problem by minimizing any additional cognitive strain. Sandbox interface 404 helps to lower the cost of looking at evidence from multiple perspectives, trying many different models, which would presumably counter rigid mindsets biases while highlighting the strengths and deficiencies of all models considered.

Figure 10A:
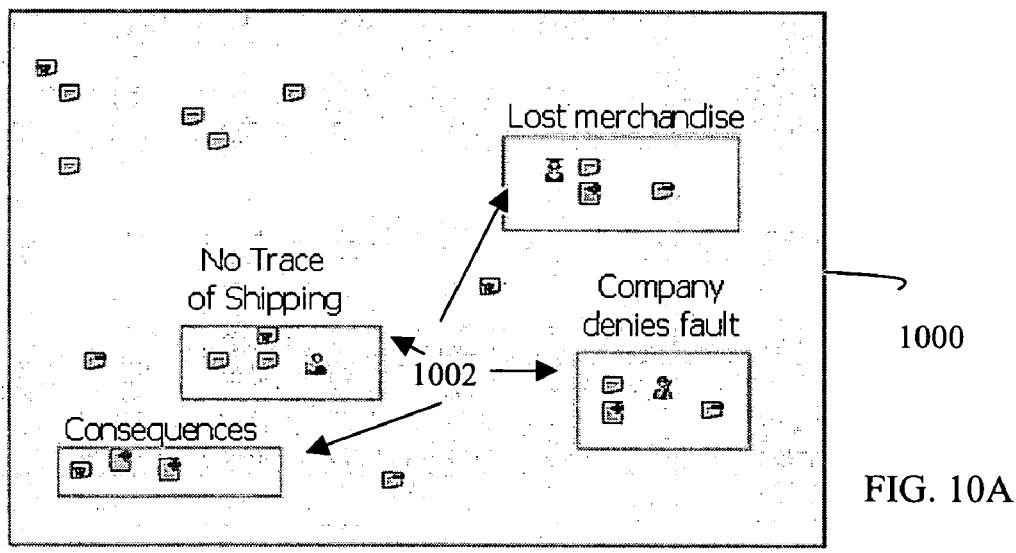
FIGS. 10A to 10C are representative screen shots showing the use of analytical templates.
Figure 10B:
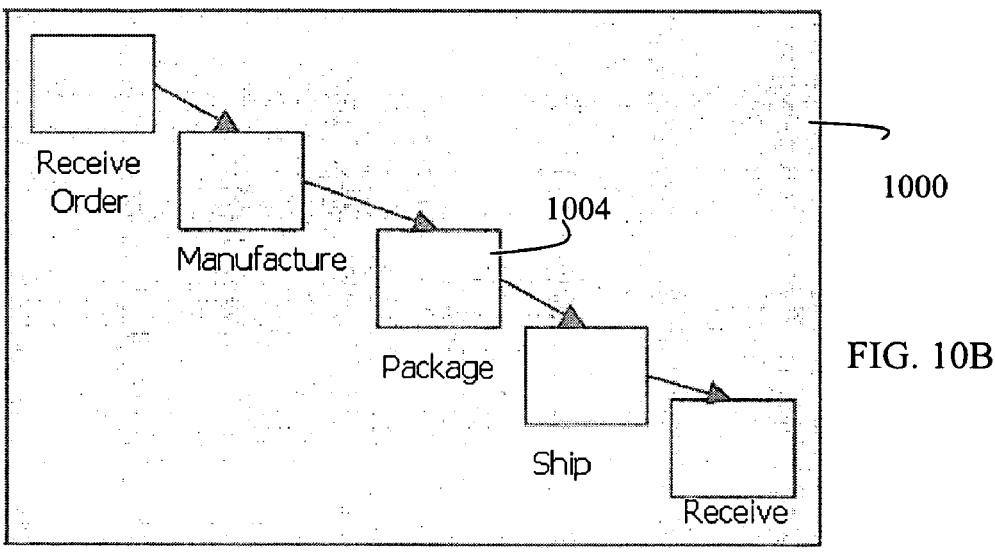
Figure 10C:
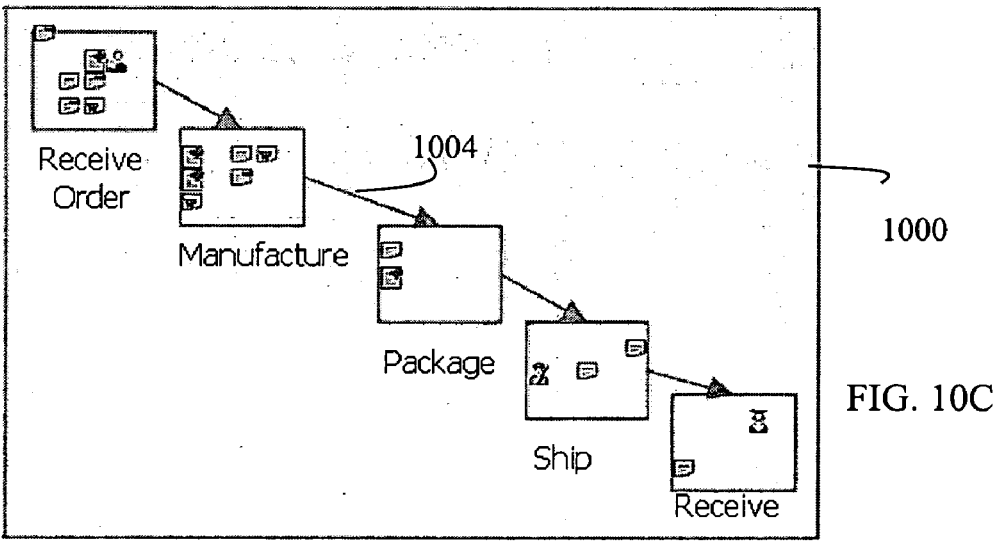

The Sandbox interface 404 can provide automatic evidence layout using "templates" of analytical frameworks. FIGS. 10A to 10C illustrate by way of example screen shots 1000 at different points in time of interface 404 to show how an analytical template may automatically organize evidence in workspace 812. An analyst may organize evidence represented in the space 812 by various data objects in groups 1002 as defined by the analyst 1002 in a specific way to support the analyst's put-this-there cognition. These tagged (i.e. associated with the excerpt) categories (groups 1002) can already be implicit from the source 14 or can be attached by the analyst through the extraction module when importing the excerpts into the Sandbox interface 404 of the representation 18 (e.g. drag and drop).

Templates comprise a plurality of linked objects organized to provide a layout for collecting evidence to support a conclusion, scenario, time-line, etc. Such templates may be pre-defined for later use and re-use. The analyst can open/select (FIG. 10B) a new template 1004 of, for example, an organization chart or a process model in display 812. The existing evidence 1002 is automatically placed in the new layout 1004 according to the excerpt categories (FIG. 10C). Placement of evidence within and without the layout template 1004 reflects similarity or closeness of fit as shown in FIG. 10C. Evidence that does not fit is placed outside an object of the template and might prompt edits to the template/model. Evidence is smoothly animated from one layout 1002 to the template layout 1004. The new layout may or may not reveal new insight into the situation under analysis. The analysts can return to the original layout 1002 quickly if required. Several such template models can be applied in succession each acting as a change of perspective for the analyst.

Document similarity using industry standard context vector clustering, latent semantic indexing or other text similarity algorithms is used to implement the templates. Newer association grounded semantics algorithms from Fair Isaac, with probability distributions over context, builds and assesses similarity of meaning in text and provides improved linguistic synonymy and polysemy performance. Clustering can be performed on Sandbox components (objects) using lightly supervised methods, for example, raining with keywords and sample documents. Subsequent "learning" and improvement is possible with "experience" and optional feedback from the analyst. Document similarity is scored and the document or other component is assigned to the closest cluster if it scores at least the threshold for that cluster. If not, the document is assigned to a "none of the above" category. Thresholds can be set interactively.

New process, organizational and other conceptual models can be constructed by an analyst using exemplary examples in the Sandbox and then communicated to the document similarity server. Exemplary examples consist of related groups of concepts (e.g. steps in a process) that together describe the whole model together with associated text examples. The groups are arranged in a layout by the analyst to represent the entire template framework model. Each group (e.g. one step in the process), describing one concept in the model, is defined using exemplary text items (e.g. notes, snippets, documents). The exemplary text is used as a cluster definition for the document similarity server. Later, when the template is applied in some different analysis situation, a similarity distance is computed between wholly new bits of text and the exemplary cluster definition.

With many such layouts placed side-by-side in the representation 18, the analyst can draw conclusions such as which model best fits the data Using the linked selection mechanism between the Sandbox and TRIST, Be diagnosticity of the evidence can also be revealed.

Process models of, for instance, a drug smuggling process, provide a structured framework to Link about subjects of interest and events. A process model helps analysts understand what is happening, why it is happening and what can be done about it.

Models provide significant benefits. They help share and harness analytical knowledge and experience. In addition, different models can help the analyst exercise a different point-of-view to help think out of their standard box or predisposition. Finally, when an analyst has a process model in mind, or in the Sandbox, what they don't know jumps out at them. Gaps are evident.

Many analysts use and invent methods, models or templates to analyze certain type of tasks. These 'Analytical Blue Prints' capture their creator's knowledge, and most analysts would benefit if this knowledge could be easily shared and re-used. One caveat of such templates is that they can become a lens sometimes resulting in dismissal of things that do not fit the model. To address this, analytical templates in the Sandbox area support various concurrent ways of thinking about a problem without adding any additional cognitive strain.

Gesture-Based and Radial Menu Input Techniques

The Sandbox interface 404 presents a gesture-based input modality to reduce procedural strain. Gestures include: Powerful finger, Create (Delete) Space, Elbows (Collision Detection), Select, Create Group, Delete, Click-and-type, Link Floating/Pick Up, and the Context Frame as described further herein with reference to FIGS. 11-17C.

Level-of-Detail (LOD) can be changed dynamically with the 'powerful-finger' mechanism. A simple gesture with a pointer (e.g. mouse) or touch screen command over a selected area of interest of the Sandbox space 812 can progressively add more details (e.g. seeing more text) and may scale the selected object (e.g. an individual excerpt, portion thereof, or group) to add emphasis (size, position, colour, font style, bold, etc.) up to the desired effect FIG. 11 shows a powerful finger tool 1102 ("the powerful finger") selected from toolbar 816 to configure the mouse/pointer and applied upon a "mouse over" to an object 1104A to render an emphasized object 1104B and as the powerful finger is maintained, render a further emphasised object 1104C. As the powerful finger 1102 is removed (mouse away), the object 1104A returns to initial size. The revealed/emphasized details can either be persisted on the representation 18 (if for example that information is particularly relevant to current train of thoughts) or be temporary and fade back upon the cessation of the mouse over (if for example the details were quickly highlighted for emphasis for a colleague). The object 1104A may be clicked with the powerful finger, for example, and scaled as desired to persist the emphasis or de-emphasis as shown in FIG. 9D.

Using the Sandbox interface 404 as an analysis tool, an objective is to allow the analyst to deal with many more plausible scenarios, at once, than could have been done before. To support a higher volume of information and thoughts, in a 'put-this-there' environment, without hindering productivity, means addressing the mechanical cost of arranging items when the aim is simply to create or delete extra space for example. This is accomplished with a simple gesture encoding the command and its parameters. For example, the mode of selection of the excerpt (based on selection speed, direction, double/triple click, etc.) can be such that each mode has a predefined output format for emphasis of the selected item (excerpt and/or associated analytical content and links). One example could be that a single click does enlargement with no persistence while a double click does both enlargement, persistence and colour change. An amount of space in the Sandbox area is created equivalent to the size of the gesture at the location and for example in the direction performed. Sandbox items can be smoothly animated to their new location and collision detection with friction is used to help insure that all items will try to stay visible and to maintain the previous/selected order of the layout. These features are described further below.

Create (Delete) Space; FIGS. 12A and 12B illustrate simple mouse or other pointer gestures 1202 and 1206 to, respectively, increases and decrease the spacing amongst objects in space 812. Pressing the left mouse button while mousing the shape of the gesture invokes the gesture. When creating space (1204A, 1204B and 1204C representations of space 812), objects are pushed away from the site of the gesture, creating room. When deleting space (1208A, 1208B and 1208C representations of space 812), the gesture removes space and draws objects items closer together. The size of the gesture may be proportional to the amount of space created or deleted between objects. Friction is used so that the amount of distance moved by each object is reduced in proportion to the proximity (i.e. distance away) from the originating gesture. Objects closer to the gesture are moved further. Objects furthest away are not moved at all. This reduces the occurrence of unanticipated side effects when creating or deleting space.

Elbows (Collision Detection): When elbows is invoked (e.g. Ctrl click) on an object, dragging the object through a field of other objects causes the other objects to move out of the way to make room for the dragged item (not shown).

Figure 13A:
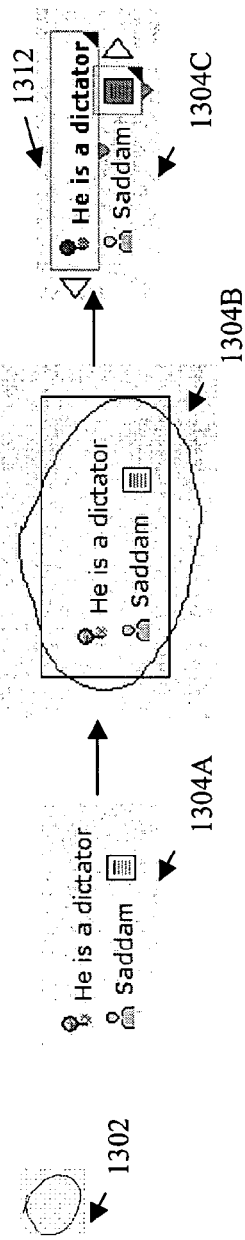

Select: As FIG. 13A illustrates, while pressing the left mouse button, drawing an enclosed shape 1302 (typically a circle or other curvilinear shape) around a group of unselected objects causes them to become selected as shown in representations 1304A, 1304B and 1304C of space 812.

Figure 13B:
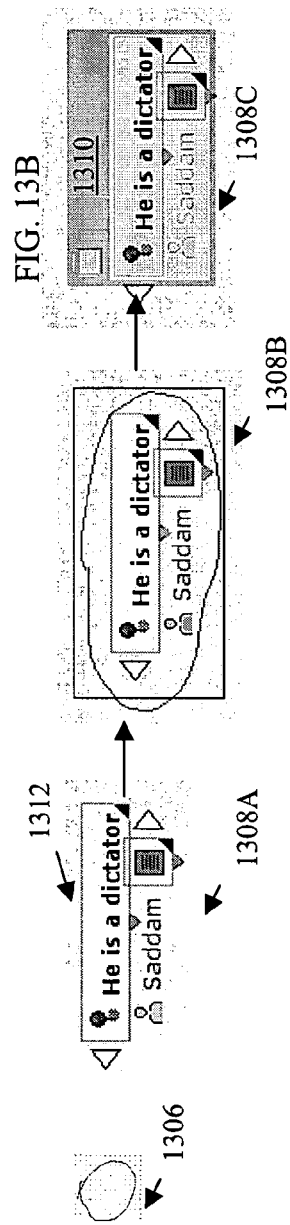
Figure 13C:
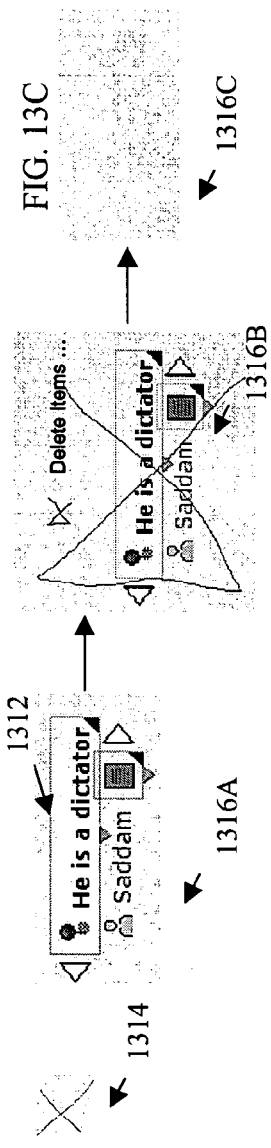

Create Group: FIG. 13B shows how the drawing of an enclosed shape 1306 (typically a circle) while pressing the left mouse button defines a gesture to create a new group 1310 (as seen in representations 1308A-1308C) in the Sandbox space 812. If previously selected objects 1312 are enclosed, these objects populate the new group 1310. Gesturing over empty space defines an empty group (not shown).

Delete: In a similar manner to the delete gesture over an empty portion of space 812 shown in FIG. 12B, performing the delete gesture over one or more selected objects 1312 in space 812 deletes the objects 1312 as shown in representations 1316A-1316C of FIG. 13C.

Click-and-type: When the user clicks on any empty space in the Sandbox space 812 and begins to type, a label (Note) will automatically be created as described previously in relation to FIG. 9A. Pressing the enter key creates a new list entry, and pressing tab (shift+tab) increases (decreases) the indent of that entry.

Figure 14:
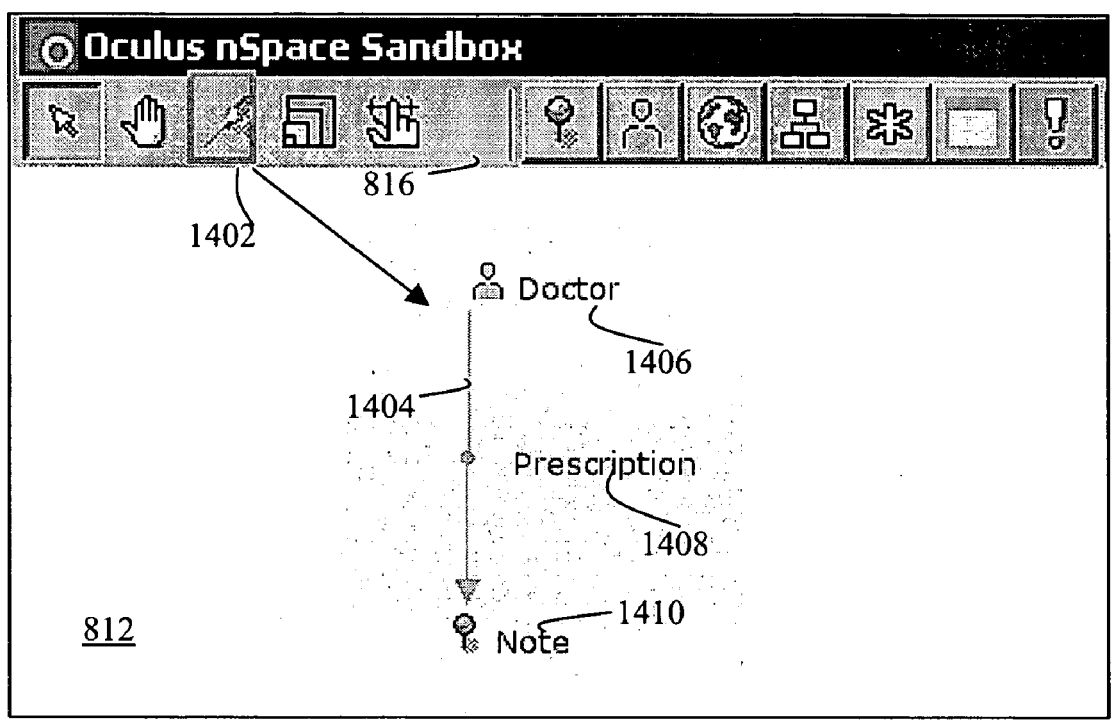

Link: As shown in FIG. 14, the link tool button 1402 configures the mouse to create a link object 1404 between two or more objects (1406-1410) at the start and end points of the gesture. Space 812 may be adapted to turn link visualisation on and off to clear distractions. Industry standard concept map diagrams, organizational charts and other linked diagrams can be made in the Sandbox using the link gesture. Moving the mouse while the left mouse button is pressed from the near proximity of one object to the center of another object may also create a link (not shown). This path does not need to be straight.

Figure 15A:
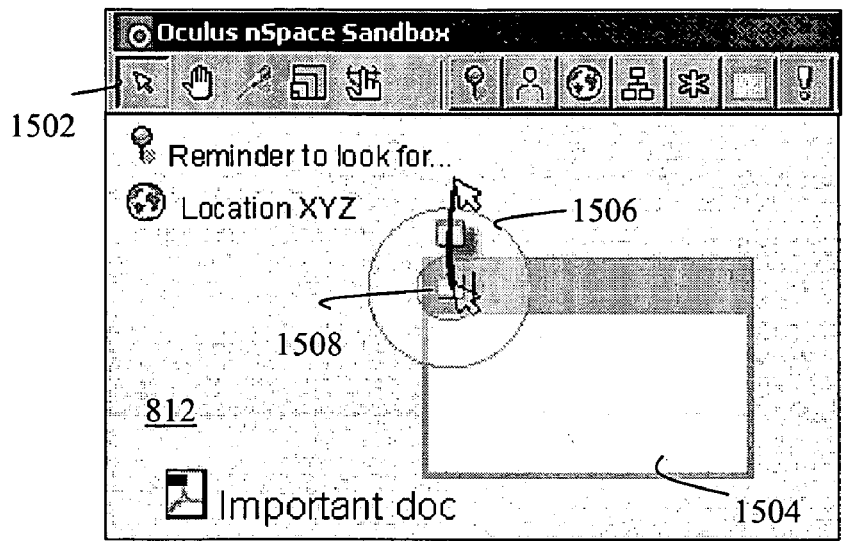
Figure 15B:
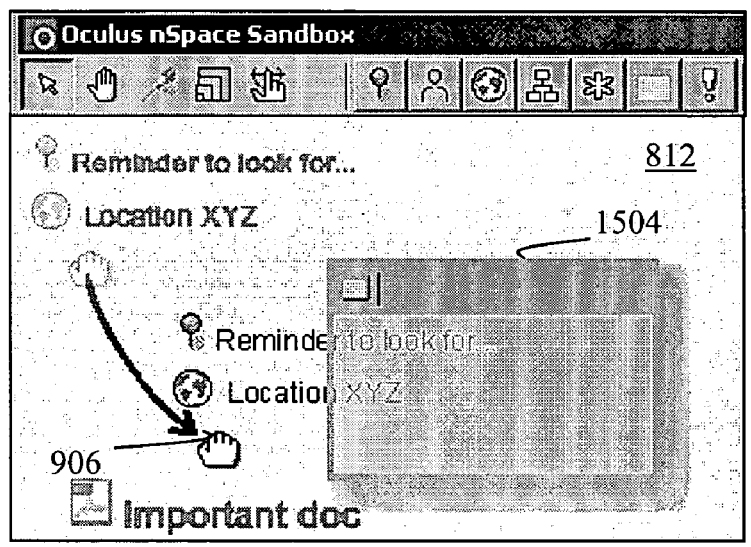
Figure 15C:
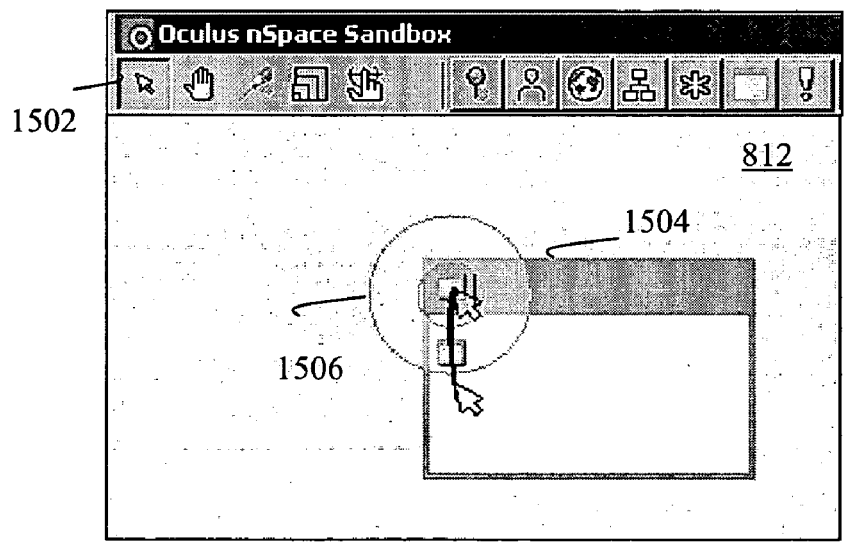

Floating/Pick Up: Objects (e.g. groups and assertions in particular) may be picked up and floated over space 812 while a user navigates the space. Preferably the floating object is made transparent to view objects underneath as the object floats. FIGS. 15A-15C illustrate a portion of space 812 to show a pick-up, navigation and put-down activity. Using an object select tool 1502 to adapt the mouse/pointer, an object 1504 may be picked-up via a simple upwards gesture over its icon 1508. The Sandbox space 812 can be dragged around under the picked-up object 1504 using the navigation tool 906 to adapt the mouse/pointer. The picked-up object remains stationary while the Sandbox space moves. Transparency of a picked-up object whereby objects underneath are viewable during pick-up assists with the floating effect. Optionally, objects can be dragged into a floating object, if applicable (not shown). A simple put-down gesture 1506 using tool 1502 places and fixes the object 104 back on space 812 at a desired location.

Figure 16A:
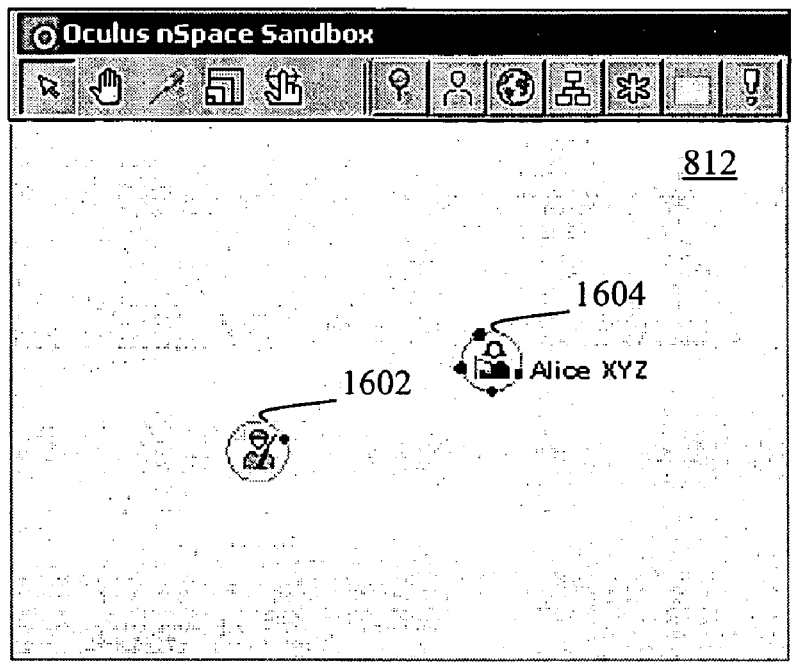
FIGS. 16A-16B are representative screen shots showing a context frame interface for the tool.
Figure 16B:
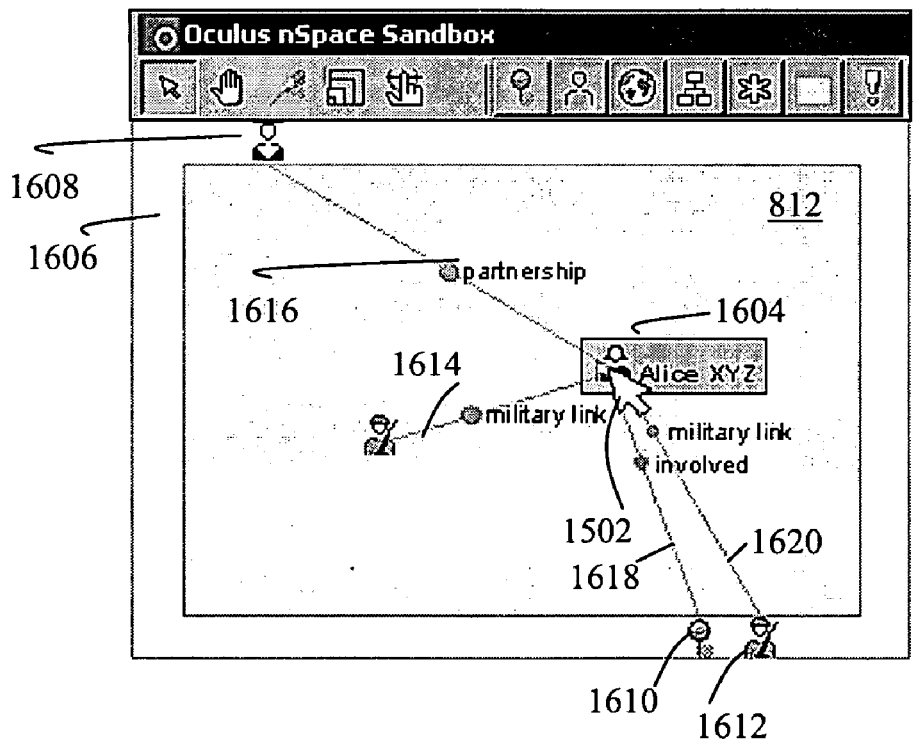

Context Frame: FIGS. 16A and 16B show two viewing modes for space 812. In FIG. 16A, space 812 is rendered with less detail, showing objects (e.g. 1602 and 1604) with a minimized amount of content (e.g. icons and name only. Relations are collapsed. Links are not rendered In FIG. 16B, in a context frame mode, selecting an object (e.g. using tool 1502) reveals important context (e.g. links 1614-1620) and linked objects (1602, 1608, 1610 and 1612) even if the linked object (e.g. 1608-1612) is not visible in the space 812 (i.e. within the resolution of the current zoom setting for the space so that such linked objects may be "off-screen"). A context frame 1606 is rendered around space 812 within which to render proxy icons representing the linked objects 1608-1612. The proxy icons are positioned in the frame along respective vectors connecting defined by the direction of the link between the object (1604) visible in space 812 and the off screen objects thus giving the user spatial context for connections even if the entire connection graph is not visible at once. The context frame viewing mode may be invoked via a tool bar button for example (not shown).

A radial menu technique may also be employed for giving quick access to menu items. Radial menus have been shown to be more efficient for accessing menu items, due to their infinite depth (as shown by Fitts' Law). The radial menu is accessed by right-clicking, and contains icons for all different entity types (person, place, organization, unknown, undefined), as well as other frequently used commands. Dragging through the slices on the radial menu and releasing the mouse button causes a menu item to be selected. FIGS. 17A-17C illustrate sequences of actions in a portion of space 812 in which an object e.g. 1702 or 1714 is selected and, via a click and hold action (for example), a radial menu 1704 is invoked and rendered around the selected object 1702 or 1714. A radial menu 1704 comprises a plurality of slices (e.g. 1706-1710) which define different selectable choices for action on the object. A null action may be made by mousing out over the object itself rather than a slice, for example or simply releasing the click without passing over a slice.

FIG. 17B illustrates a sequence of actions showing that a radial menu may extend via a slice e.g. 1710 of the first radial menu 1704 to present further selectable options 1712 in extended radial slices. FIG. 17C shows a sequence where an action (e.g. text enlargement or emphasis) is selected via slice 1706 to configure the mouse to operate the action via a her gesture 1716. In the example shown, the proportion of the gesture 1716 is relative to the application of the action to the object 1714.

Scalability to Increase Volume of Thinking and Productivity

The objective is to allow Sandbox content to scale to the massive without hindering the analyst's productivity. Each item in the Sandbox can be seen in the representation 18 at multiple levels of details (LOD) individually. At the lowest LOD, intuitive iconic representations are compact and much easier to recognize and scan than text (FIG. 9B). Nothing needs to be hidden, the information elements is always kept, which should reduce cognitive load and help counter the recency bias. In the Sandbox interface, the user-created layout encodes meaning and context LOD scaling with the powerful finger gesture (FIG. 11 and FIG. 9D) maintains the semantics of the layouts.

As shown in FIG. 8A, at all times, the 'big picture' (i.e. the full content of the Sandbox) can be visible in the thumbnail navigator window 814. Though shown at the lower left, it may be moved about space 812 by a user. As described above, window 814 may be used to navigate the Sandbox area. Additional navigational aids include floating objects (FIG. 15A-15C). An object can be selected to float or hover above the workspace 812 as the user pans about the Sandbox interface 404. The floating object of interest remains in view while other items are reviewed. The floating object can maintain its original position in the Sandbox (if desired by cancelling the float) or placed in a new area. Another feature illustrated and described with reference to FIGS. 16A-16C is the context frame that provides information about linked items that may be outside the present view of space 812.

Nothing needs to be hidden and the context of the information is easily accessible in TRIST. Changing LOD dynamically with the powerful finger gesture can maintain the semantics of the layouts. Thumbnail navigation for the Sandbox provides for quick directed movement within large Sandboxes. Thumbnail level of detail for groups minimizes a group while still preserving the semantic layout of information. Items in the Sandbox can also be automatically arranged to "tidy up" information into lists and resize their parent groups to occupy the minimum amount of space. This process is animated, allowing the user to see where their information is being moved to.

Points of view in the Sandbox can be saved, labelled and then used to smoothly animate to the point of view (not shown). Sandboxes can grow large in extent such that the entire space 812 presented by the interface 404 is best viewed in portions as shown in various Figures throughout (e.g. using a zoom feature common to viewing a space at different resolutions). A point of view defining a particular portion of the entire space to be visualized by the user interface 404 may be configured by the user via the interface 404. More than one point of view for different portions to visualize may be defined. A point of view may be represented (not shown) as an object in space 812. Clicking on a saved point of view invokes the interface to visualize the associated portion and lets the analyst quickly navigate to different areas of the Sandbox space 812. Points of view may be advantageously arranged in a floating group object to be close at hand.

Conclusions from other analysis software systems can be placed (not shown) within the Sandbox and used in a Sandbox analysis layout. Using the nSpace protocol 321, the conclusion from the other software system (e.g. 303) is dragged and dropped into the Sandbox interface 404. A thumbnail image of the screenshot from the other software system (e.g. 303), the name of the conclusion as well as supporting data are placed in a Sandbox group. That Sandbox group can then be used by the analyst as part of an argument, line of reasoning or simply as a note.

Encourage Best Analytical Practices—Dragging-Hand Gesture for Evidence Gates

The explicit representation of assertions and how evidence supports or refutes each assertion is another mechanism that has been implemented to support best practices in analytical methods. The assertions make explicit the points or hypotheses the analyst is trying to prove/disprove. In the Sandbox interface 404 and more specifically space 812, an assertion is represented as a group that has visually represented assertion gates: 'Support and Refute Gates'. The act of binding evidence to an assertion is done fluidly by dragging the evidence to the assertion group through the appropriate gate. A gate can be defined as a predefined visual association mechanism/construct for binding two or more distinct information excerpts (or portions thereof) through analytical content, such as but not limited to binding assertions with evidence. The gates can be along the right and left edges of the group box and can light up, for example, red or green (or other visual mechanism) when evidence is brought into the assertion. The existence of the 'Refute Gate' should encourage the application of the scientific method, where the focus is on disproving hypotheses. Thus the tool monitors the position of the dragging action relative to the location of the gates and determines the connection or binding between the excerpts (an object with evidence) automatically. A neutral gate for those objects which do not support or refute the assertion (or which have yet to be determined) may be defined as well (e.g. top and or bottom).

Figure 18A:
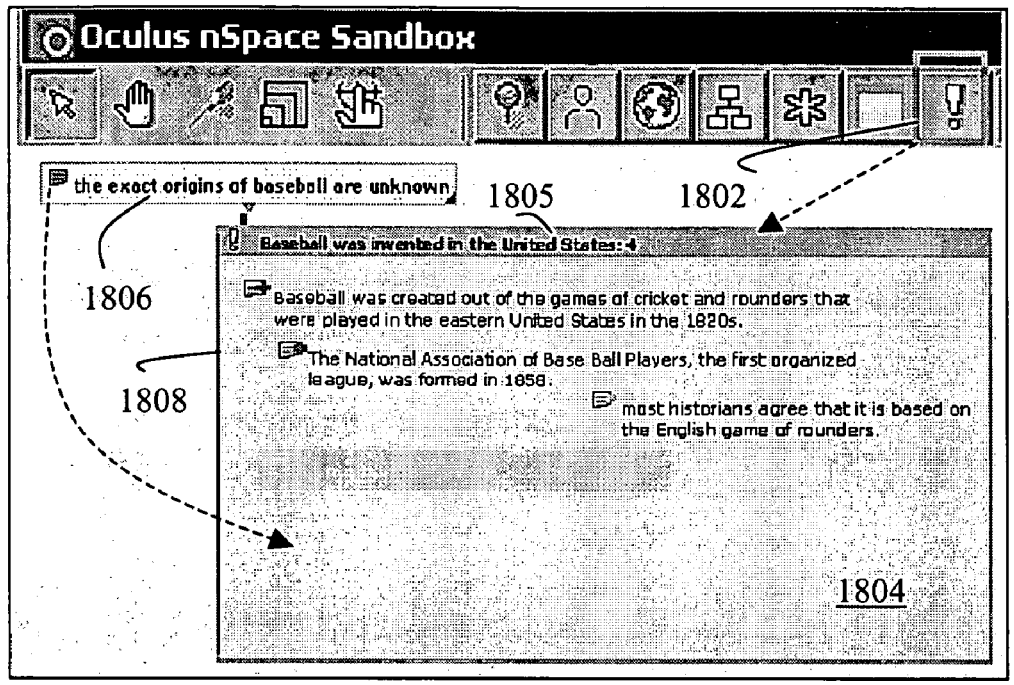
FIGS. 18A-18B are a screen shot and enlargement showing assertion group objects of the tool.
Figure 18B:
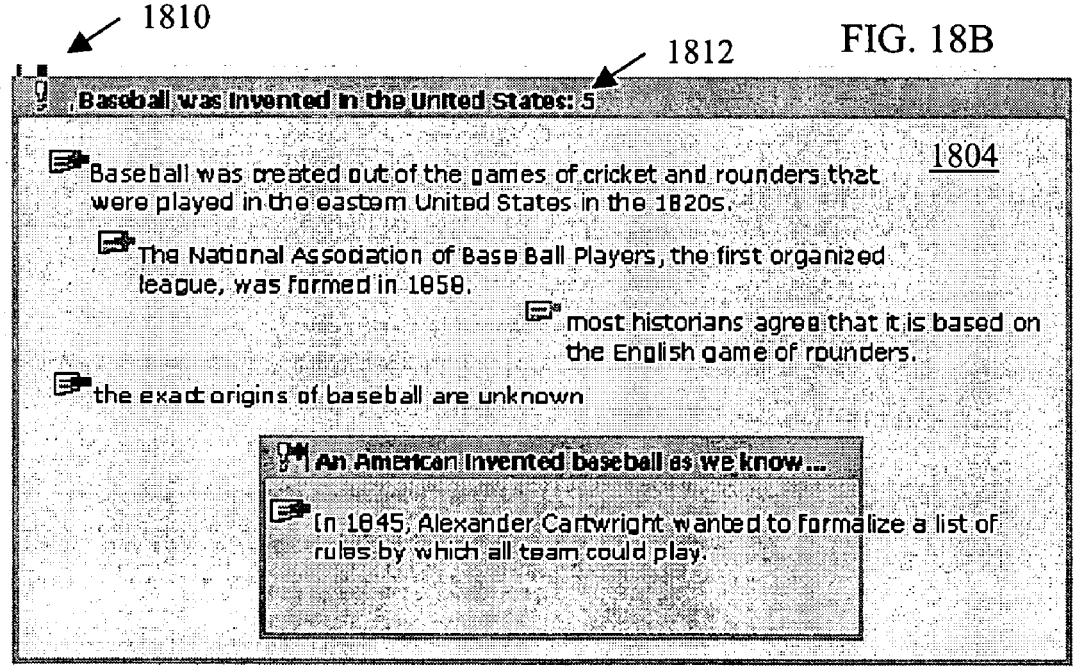

FIG. 18A illustrates a portion of space 812 in which an assertion tool 1802 is dragged to the space 812 to define an assertion group object 1804. The title or name 1805 of the group can be entered to define the assertion to be proved true or false. Objects in space 812 (e.g. 1806) can be dragged into the assertion group object 1804 via an assertion gate (e.g. 1808) and placed in a desired location. The gate preferably changes color or other emphasis to confirm the gesture. At the top-left corner of each assertion, a graphical cumulative "score" is displayed for 'at a glance' reminder of the level of evidence found so far. The cumulative score takes into account all tied evidence and nested assertions (linked assertions). Nesting assertions is a way to create inference networks (not shown). FIG. 18B is an enlarged view of object 1804 showing assertion counts in a histogram format and preferably colour coded similarly to the gates (e.g. red and green). Also shown is object count 1812 indicating the number of objects in the assertion group 1804. A count of contained objects may be maintained and displayed for regular group objects as well as assertion groups. Regular groups may be defined in a similar fashion though without assertion gates or assertion counts (not shown).

Analysis of Competing Hypotheses (ACH)

The Sandbox implements industry standard ACH techniques through the use of assertions. These are used to create multiple alternative hypotheses, which lead to a logical comparison of hypotheses. By visually representing this comparison, gaps in evidence and reasoning become evident, and encourage the analyst to explore new paths. Diagnosticity of evidence is shown. (Evidence that uniquely contributes to one competing hypothesis is diagnostic. Evidence that contributes to all competing hypotheses is not diagnostic.) Evidence that is low in diagnosticity becomes fizzy in its' display and does not contribute to the graphical score of an assertion.

Reporting

Figure 19:
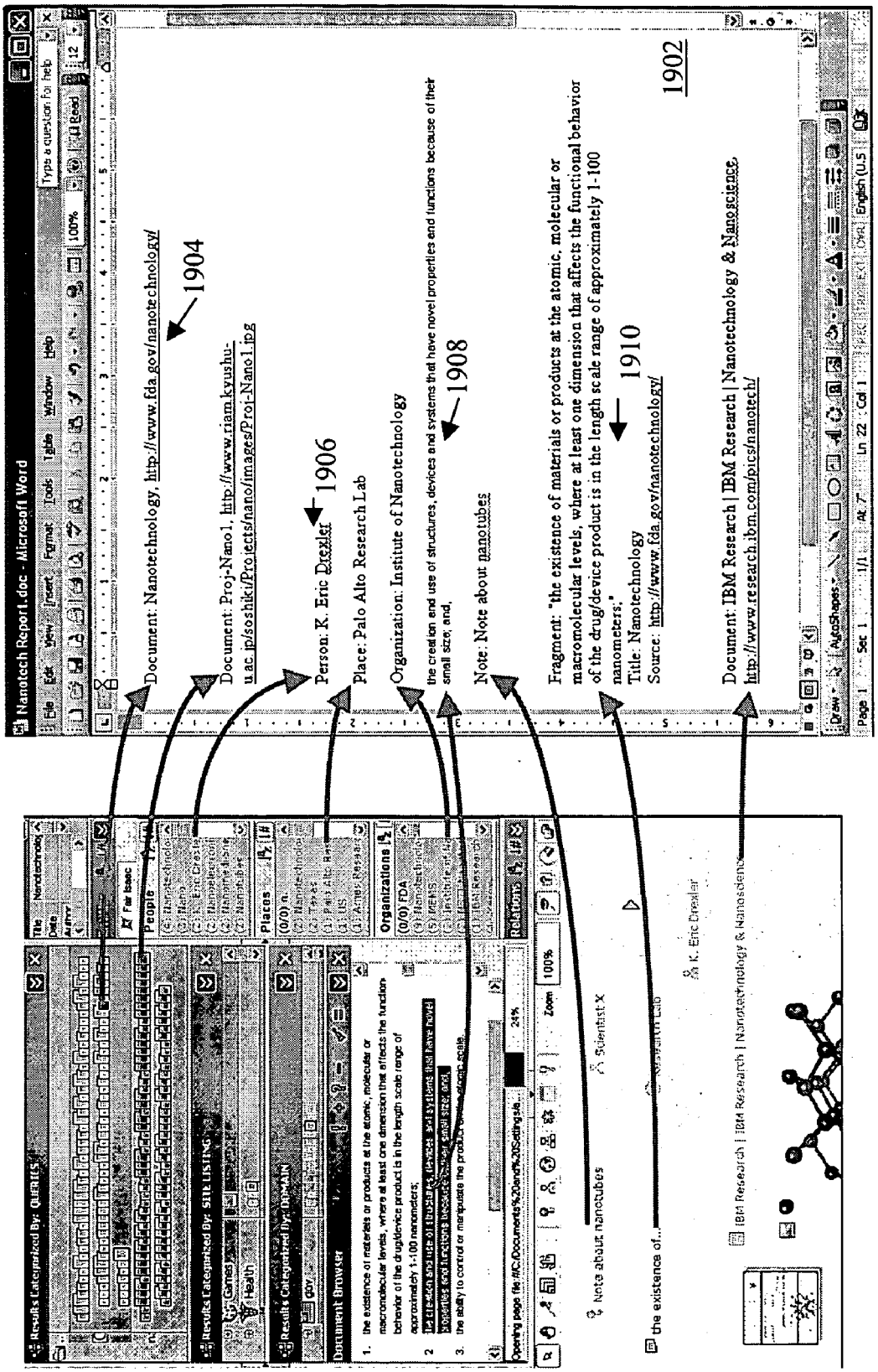
FIGS. 19 and 20 illustrate report and presentation features, exporting data from the tool.
Figure 20:
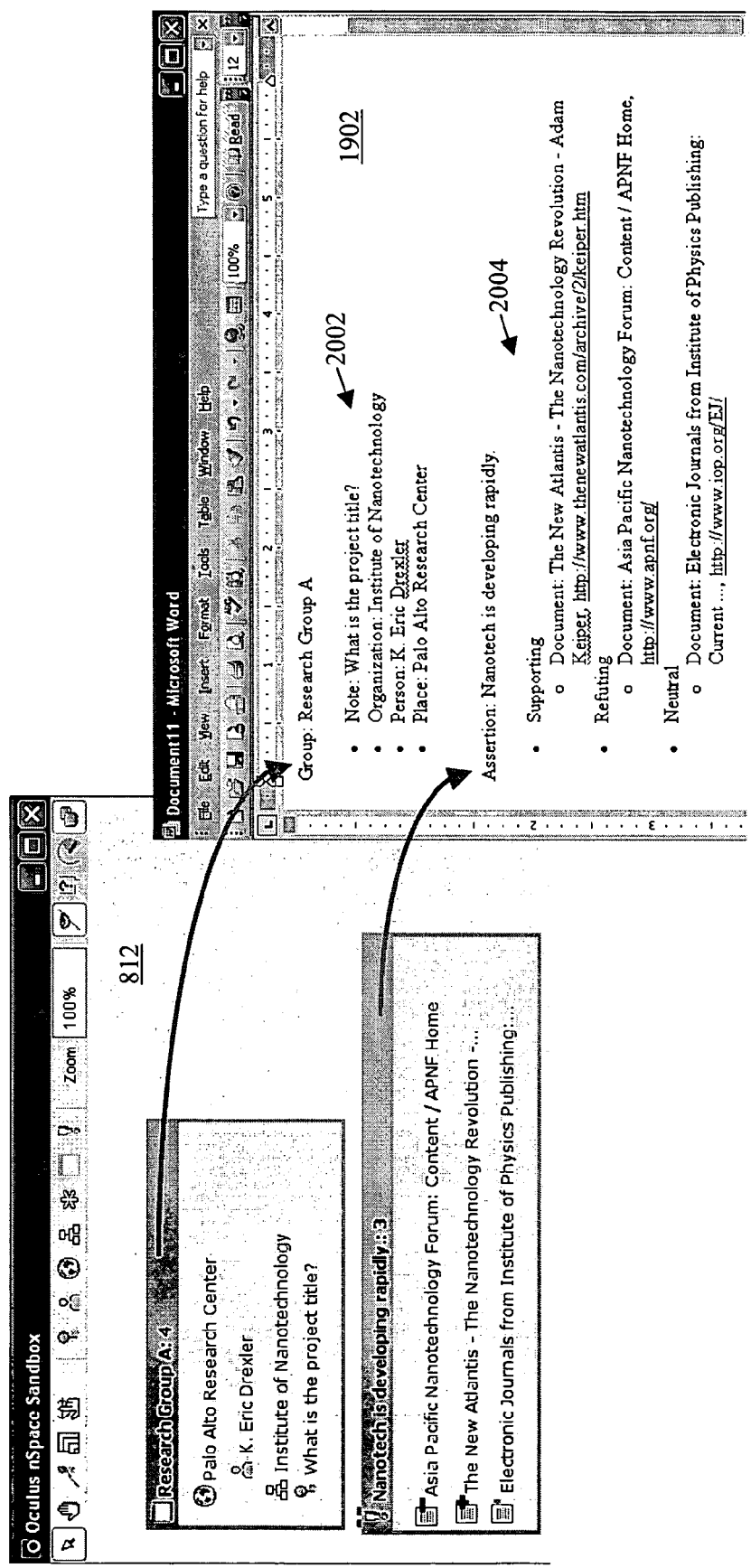

Reporting and presenting data and knowledge gained using TRIST and Sandbox is illustrated in FIGS. 19 and 20. Using a drag and drop methodology, objects from the Sandbox including notes, image source information (e.g. 1904), entities (e.g. 1906), portions 1908 from a browser, fragments 1910 from a browser previously saved to Sandbox 404 or any other objects in TRIST and Sandbox may be dropped into word processing 1902 or other report writing software (e.g. Microsoft Word). Group objects e.g. 2002 including assertion group objects e.g. 2004 (See FIG. 20) are laid out using bulleted lists with hierarchy and context maintained. The powerful finger gesture, that adds temporary emphasis by making objects in the Sandbox larger, can be used during presentations of an analysis in the Sandbox. Point of view icons (spatial bookmarks) can be used to navigate through the Sandbox space 812 along a path defined by the analyst.

Example Workflows—Module

With a new tasking, the analyst might start brainstorming in the Sandbox interface, using prior and tacit knowledge to generate hypotheses or alternative scenarios, to jot down the key questions and maybe an analytical strategy or plan. Divergent thinking, crucial at this stage, is unrestricted in the Sandbox. Thoughts can flow freely, and be quickly organized to create more structure on the fly.

As relevant information is found in TRIST, it can be immediately integrated in the big picture, by either binding it to various alternatives or creating new ones to account for that evidence. Annotations and notes can be made by the analysis to describe their thoughts. The big picture in the Sandbox provides at a glance what needs to be proved or disproved, where evidence is lacking, and helps keep the collection process focused and efficient.

Notes, snippets, documents, images, groups and links are all used to sketch out the situation under analysis. Similar issues are placed together. Connected issues are linked. Important items are emphasized by making them larger in size. Background information is made small. Visual arrangements are used to describe and think about the situation. Hypotheses are made and the evidence is marshalled.

To reduce the cognitive biases associated with a particular mindset, exploring different perspectives is another key workflow. Trying to fit the collected evidence to different template models might reveal gaps or different possible interpretations of the evidence. Either the workflow module can be prompted by the user or the module can prompt the user in coordination of workflow in analysis of the excerpts and associated analytical content.

TRIST multi-dimensional linked views can be used to assess the evidence in the Sandbox. Because all information saved in the Sandbox (e.g. snippets, images, documents) are still linked back to their originating source document in TRIST, when that information is selected in the Sandbox, it is also highlighted in the multi-dimensional linked views of TRIST. So, for example, if there are dimensions of time and of country in TRIST, selecting a set of Sandbox evidence will highlight the source documents in those dimensions. The analyst could see at a glance if all their evidence was old or and which countries are associated with the evidence.

Concept dimensions and cluster dimensions can also be used to assess Sandbox evidence. Concept map expressions of Sandbox knowledge can be formed. Using semantic analysis text-to-concept-map engines, any textual object can be transformed into a concept map. The resulting concept map can then be used in TRIST for defining a dimension for organizing retrieved information. In addition, a Clustering Dimension, using unsupervised clustering (UC) document similarity algorithms, can also define a dimension in TRIST. Information objects from the Sandbox dragged into that Dimension region are clustered automatically on the fly and categories representative of the clusters are created automatically. No prior knowledge of that category is necessary. UC can cluster independently of content, no ontology is needed (so for instance, documents could be in any foreign language, as long as the corpus is also in that language). The analyst can reclassify all or a subset of the results on the fly, building quick understanding of content by quickly chunking it in many different ways. This functionality can also be used to isolate unusual results or specific results. Multiple dimensions of the problem are displayed and connected simultaneously.

An analyst can collaborate with other analysts by presenting the analysis in the Sandbox. Gestures and navigation can be used to show the analysis, to assess evidence and hypotheses and to brainstorm.

At the end of the analysis, or at any intermediate point in the analysis, a report can be made by dragging information objects to a text editor like MS Word and then writing the report.

Although preferred embodiments of the invention have been described herein, it will be understood by those skilled in the art that variations may be made thereto without departing from the spirit of the invention or the scope of the appended claims. For example, Sandbox interface 404 may be detached from TRIST interface 402 for separate window viewing. Though the techniques herein are described with reference to analysis tasks, marshalling evidence in a work space, such techniques may be adapted to other software such as word processing, presentation creation (e.g. PowerPoint), drawing creation and other software particularly where objects are rendered in a space.

What is claimed is:

1. A computer-implemented visualization system for information analysis, the system comprising:
   a user interface;
   a processor and a memory coupled thereto, the memory storing instructions and data therein to configure the execution of the processor to configure a space on the user interface for marshalling evidence therein, the processor further configured to:
      visually represent a plurality of information excerpts from at least one information source in a spatial arrangement in the space on the user interface; and
      receive user input to manipulate the spatial arrangement of the plurality of information excerpts with respect to one another on the user interface as directed by the user for defining the evidence;
      receive analysis content on the user interface for associating with the plurality of information excerpts to facilitate visual cognition of the evidence in accordance with the manipulated spatial arrangement.

2. The visualization system of claim 1 wherein the processor is further configured to provide a link component for maintaining links between information excerpts and associated analysis content, if any, and respective information sources from which said information excerpts originate; and wherein said user interface is configured to visually represent said links.

3. The visualization system of claim 1 wherein the processor is further configured to provide one or more analytical templates for use by the user on the user interface, each of said analytical templates defining a particular spatial arrangement within which to arrange the information.

4. The visualization system of claim 3, wherein the processor is further configured to determine automatically similarities in meaning of the content of each of said information and wherein said user interface is configured to automatically arrange the information in the particular spatial arrangement of a one of said analytical templates in accordance with the determined similarities.

5. The visualization system of claim 4 wherein the process is further configured to define a user-defined analytic template in accordance with user input, said user input providing a plurality of groups of concepts within which information can be placed, concept definitions associated with respective groups for directing a service for determining automatically similarities in meaning of the content of the information to be placed in the groups and a layout for arranging the groups of concepts in said space to provide a spatial arrangement for the information to be arranged.

6. The visualization system of claim 3 wherein the processor is further configured to cause said user interface to selectively switch between one or more views of spatial arrangements of the information, at least some of said views defined by said analytical templates with which a user may explore different evidence marshalling options.

7. The visualization system of claim 1 wherein the processor is further configured to represent the information on the user interface as objects movable in said space and wherein said user input comprises gestures using a user input, said user interface adapted to interpret the shape or shape and size of a gesture to interact with said objects according to an action associated with said gesture.

8. The visualization system of claim 7 wherein the processor is further configured to apply the action to the objects according to the proximity of the respective objects to the gesture in said space.

9. The visualization system of claim 7 wherein said shape is substantially an "X" and said action associated with the shape is one of delete an object or delete space between objects.

10. The visualization system of claim 7 wherein the shape is substantially a "^" and said action associated with shape inserts space between objects.

11. The visualization system of claim 1 wherein the processor is further configured to represent the information on the user interface as data objects movable in said space and wherein said user interface is adapted to represent said data objects in accordance with a user selectable level of detail.

12. The visualization system of claim 11 wherein the processor is further configured to emphasize a selected data object on the user interface in response to a pointing input of said user, at least one of a magnitude and a duration of emphasis being applied to the selected data object in response to a duration of said pointing input.

13. The visualization system of claim 12 wherein the processor is further configured to persist the emphasis applied to the selected data object on the user interface in response to a user input.

14. The visualization system of claim 1 wherein the processor is further configured to represent the information on the user interface as data objects movable in said space and to visualize a first portion of said space and float a selected data object over data objects not selected to float in said space, whereby, while moving along a path to visualize a second portion of said space, said data objects not selected to float and located along the path are visualized under said selected data object.

15. The visualization system of claim 14 wherein the processor is further configured to visually represent the selected data object transparently on the user interface thereby to visualize data objects under said selected data object.

16. The visualization system of claim 1 wherein the processor is further configured to represent the information as data objects movable in said space and to visualize a portion of said space on the user interface; and, further wherein said user interface is configured to selectively render a context frame about said portion within which proxy data objects are visualized for data objects that are not visible in said portion of space but are associated with data objects that are visible in said portion.

17. The visualization system of claim 1 wherein the processor is further configured to represent the information on the user interface as data objects movable in said space and, selectively for a particular data object, to visualize a radial menu on the user interface comprising a plurality of slices presenting selectable actions arranged radially about the particular data object.

18. The visualization system of claim 1 wherein the processor is further configured to represent the information as data objects on the user interface movable in said space, said data objects having one of a plurality of types, and wherein said processor is configured to permit a user to define a data object having an assertion type with which to group other data objects to prove a truth or falsity of an assertion associated with the data object having an assertion type, said data object having an assertion type comprising assertion gates, at least one assertion gate for proving the assertion and one assertion gate for disproving the assertion, through which said other data objects are moved to automatically bind respective other data objects in accordance with their support for the assertion.

19. The visualization system of claim 18 wherein the assertion gates are adapted to generate a respective count of data objects moved through the assertion gates for visualizing with the data object having an assertion type.

20. The visualization system of claim 1 wherein the processor is further configured to visualize a plurality of portions of said space and configured to define points of view on the user interface corresponding to user selected ones of the portions and that invoking any of the points of view selectively visualizes the associated portion of the space.

21. The visualization system of claim 1 wherein the processor is further configured to provide an information scanning and retrieval component coupled to the user interface for gathering source document information with which to define information excerpts, said information scanning and retrieval component representing the source document information in user selectable multi-dimensional linked views.

22. The visualization system of claim 21 wherein the user interface is coupled via a link selection and data exchange component for maintaining links between respective source document information in the multi-dimensional linked views; and links between information excerpt data objects and associated analysis content data objects, if any, and respective source document information from which said information excerpt data objects originate; and
  wherein the user interface is adapted to visualize the links between information excerpt data objects selected in the space and respective source document information from which said information excerpt data objects originate in the multi-dimensional linked views.

23. The visualization system of claim 22 wherein the user interface is coupled to one or more computational linguistic resource services for automatically generating concept maps for concept dimensions or document clusters for clustering dimensions and wherein the user interface is adapted to use said services to analyze information selected from the space by the user to generate a dimension definition for use by the information scanning and retrieval component in the multi-dimensional linked views thereby to re-visualize the source document information.

24. The visualization system of claim 1 wherein the user interface is coupled to a data store for persisting the information in accordance with the spatial arrangement.

* * * * *